United States Patent
John Wilson et al.

(10) Patent No.: US 12,015,999 B2
(45) Date of Patent: Jun. 18, 2024

(54) DEFAULT BEAM IDENTIFICATION AND BEAM FAILURE DETECTION IN CROSS CARRIER SCHEDULING

(71) Applicant: QUALCOMM Incorporated, San Diego, CA (US)

(72) Inventors: Makesh Pravin John Wilson, San Diego, CA (US); Tao Luo, San Diego, CA (US); Peter Gaal, San Diego, CA (US); Wanshi Chen, San Diego, CA (US); Kiran Venugopal, Green Brook, NJ (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/895,851

(22) Filed: Aug. 25, 2022

(65) Prior Publication Data

US 2022/0408421 A1    Dec. 22, 2022

Related U.S. Application Data

(62) Division of application No. 16/738,912, filed on Jan. 9, 2020, now Pat. No. 11,438,887.

(Continued)

(51) Int. Cl.
*H04W 72/044* (2023.01)
*H04W 24/10* (2009.01)
*H04W 72/23* (2023.01)

(52) U.S. Cl.
CPC ......... *H04W 72/044* (2013.01); *H04W 24/10* (2013.01); *H04W 72/23* (2023.01)

(58) Field of Classification Search
CPC .... H04W 72/044; H04W 72/23; H04W 24/10
See application file for complete search history.

(56) References Cited

U.S. PATENT DOCUMENTS

| 8,923,223 B2 | 12/2014 | Chen et al. |
| 2012/0113946 A1 | 5/2012 | Seo et al. |

(Continued)

FOREIGN PATENT DOCUMENTS

| WO | WO-2011037392 A2 | 3/2011 |
| WO | WO-2012024141 | 2/2012 |

(Continued)

OTHER PUBLICATIONS

International Preliminary Report on Patentability—PCT/US2020/013209, The International Bureau of WIPO—Geneva, Switzerland, dated Jul. 22, 2021.

(Continued)

*Primary Examiner* — Chi Ho A Lee
*Assistant Examiner* — Andrew Lee
(74) *Attorney, Agent, or Firm* — QUALCOMM Incorporated

(57) ABSTRACT

Methods, systems, and devices for wireless communications are described. A base station may transmit a first downlink grant (e.g., a PDCCH transmission) for a first data transmission (e.g., a PDSCH transmission) over a first component carrier; the first data transmission over a second component carrier; and a second downlink grant (e.g., another PDCCH transmission) for a second data transmission (e.g., another PDSCH transmission) over the second component carrier. A user equipment (UE) receives the first data transmission over a first beam and may use the first beam for receiving the second data transmission. Additionally or alternatively, the UE may receive a configuration message indicating a set of TCI states for downlink data transmissions to the UE; identify one or more reference signals (Continued)

monitor for beam failure detection (BFD), identify one or more BFD beams, monitor the identified one or more reference signals; and selectively trigger a beam failure reporting procedure.

30 Claims, 20 Drawing Sheets

Related U.S. Application Data

(60) Provisional application No. 62/791,506, filed on Jan. 11, 2019.

(56) References Cited

U.S. PATENT DOCUMENTS

| | | |
|---|---|---|
| 2012/0177000 A1 | 7/2012 | Seo et al. |
| 2016/0278118 A1 | 9/2016 | Yerramalli et al. |
| 2018/0302889 A1 | 10/2018 | Guo et al. |
| 2018/0324018 A1 | 11/2018 | Hosseini et al. |
| 2019/0068268 A1 | 2/2019 | Zhang et al. |
| 2019/0230545 A1* | 7/2019 | Liou ............ H04W 24/10 |
| 2019/0253941 A1 | 8/2019 | Cirik et al. |
| 2019/0289573 A1 | 9/2019 | Hwang et al. |
| 2019/0349061 A1 | 11/2019 | Cirik et al. |
| 2020/0059285 A1 | 2/2020 | Zhang et al. |
| 2020/0099492 A1* | 3/2020 | Shi ............ H04L 5/0053 |
| 2020/0137821 A1* | 4/2020 | Cirik ............ H04W 76/19 |
| 2020/0178134 A1* | 6/2020 | Yang ............ H04W 24/04 |
| 2020/0229169 A1 | 7/2020 | John Wilson et al. |
| 2020/0274657 A1* | 8/2020 | Deenoo ............ H04W 36/0058 |
| 2020/0296749 A1 | 9/2020 | Freda et al. |
| 2020/0351126 A1* | 11/2020 | Siomina ............ H04L 5/005 |
| 2020/0383096 A1* | 12/2020 | Yang ............ H04W 72/20 |
| 2020/0389884 A1* | 12/2020 | Hakola ............ H04W 36/0085 |
| 2021/0058999 A1* | 2/2021 | Chen ............ H04W 72/23 |
| 2021/0167930 A1 | 6/2021 | Jeon et al. |
| 2021/0189967 A1* | 6/2021 | Meyers ............ F02C 7/12 |
| 2021/0194642 A1 | 6/2021 | Belleschi et al. |
| 2021/0235425 A1* | 7/2021 | Kim ............ H04W 72/23 |
| 2021/0281295 A1 | 9/2021 | Li et al. |
| 2021/0282168 A1* | 9/2021 | Matsumura ............ H04L 5/0048 |
| 2021/0297886 A1 | 9/2021 | Chen et al. |
| 2021/0329571 A1 | 10/2021 | Yu et al. |
| 2021/0385896 A1 | 12/2021 | Kim |

FOREIGN PATENT DOCUMENTS

| | | |
|---|---|---|
| WO | WO-2018129300 A1 | 7/2018 |
| WO | WO-2018190617 A1 | 10/2018 |

OTHER PUBLICATIONS

International Search Report and Written Opinion—PCT/US2020/013209—ISA/EPO—dated May 11, 2020.
Partial International Search Report—PCT/US2020/013209—ISA/EPO—dated Mar. 27, 2020.

* cited by examiner

PDCCH 210

PDSCH 215

DEFAULT BEAM IDENTIFICATION AND BEAM FAILURE DETECTION IN CROSS CARRIER SCHEDULING

CROSS REFERENCE

The present application for patent is a Divisional of U.S. patent application Ser. No. 16/738,912 by JOHN WILSON et al., entitled "DEFAULT BEAM IDENTIFICATION AND BEAM FAILURE DETECTION IN CROSS CARRIER SCHEDULING" filed Jan. 9, 2020, which claims the benefit of U.S. Provisional Patent Application No. 62/791,506 by JOHN WILSON et al., entitled "DEFAULT BEAM IDENTIFICATION AND BEAM FAILURE DETECTION IN CROSS CARRIER SCHEDULING," filed Jan. 11, 2019, assigned to the assignee hereof, and expressly incorporated herein.

BACKGROUND

The following relates generally to wireless communications and to default beam identification and beam failure detection for cross carrier scheduling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support default beam identification and beam failure detection for cross carrier scheduling. Generally, the described techniques provide for a UE to reuse a default beam from a first cross-carrier scheduled data transmission (such as a physical downlink shared channel (PDSCH) transmission) when receiving a second cross-carrier scheduled data transmission (e.g., another PDSCH transmission) that occurs within a threshold amount of time after receiving a downlink grant (such as in a physical downlink control channel (PDCCH) transmission) for the second cross-carrier scheduled data transmission Additionally or alternatively, a UE may perform beam failure detection (BFD) to determine if beam failure has occurred. As the component carrier upon which a cross-carrier scheduled PDSCH transmission occurs may not be associated with a control resource set (CORESET), the UE may rely on a quantity of down selected transmission configuration indicator (TCI) states configured for the UE to determine which reference signals and, by extension, which beams to monitor for beam failure. If the UE detects a beam failure from the monitored beams, the UE may trigger a beam failure reporting procedure (e.g., beam recovery).

In some cases, a UE in a wireless communications system may be capable of communicating over multiple component carriers or wireless channels. Such UEs may implement cross-carrier scheduling by receiving control information on one component carrier that schedules downlink transmissions on another component carrier. Improved techniques for default beam identification and BFD for cross-carrier scheduling are desired.

A method of wireless communication at a UE is described. The method may include receiving, over a first component carrier, a first downlink grant for a first data transmission over a second component carrier, receiving the first data transmission over the second component carrier using a first beam as a default beam, receiving, over the first component carrier, a second downlink grant for a second data transmission over the second component carrier, selecting the first beam as the default beam for the second data transmission based on a receive time of the second data transmission occurring within a first threshold time window following the second downlink grant, and receiving, based on the second downlink grant, the second data transmission over the second component carrier using the first beam as the default beam.

An apparatus for wireless communication at a UE is described. The apparatus may include a processor, memory coupled to the processor, and instructions stored in the memory. The instructions may be executable by the processor to cause the apparatus to receive, over a first component carrier, a first downlink grant for a first data transmission over a second component carrier, receive the first data transmission over the second component carrier using a first beam as a default beam, receive, over the first component carrier, a second downlink grant for a second data transmission over the second component carrier, select the first beam as the default beam for the second data transmission based on a receive time of the second data transmission occurring within a first threshold time window following the second downlink grant, and receive, based on the second downlink grant, the second data transmission over the second component carrier using the first beam as the default beam.

Another apparatus for wireless communication at a UE is described. The apparatus may include means for receiving, over a first component carrier, a first downlink grant for a first data transmission over a second component carrier, receiving the first data transmission over the second component carrier using a first beam as a default beam, receiving, over the first component carrier, a second downlink grant for a second data transmission over the second component carrier, selecting the first beam as the default beam for the second data transmission based on a receive time of the second data transmission occurring within a first threshold time window following the second downlink grant, and receiving, based on the second downlink grant, the second data transmission over the second component carrier using the first beam as the default beam.

A non-transitory computer-readable medium storing code for wireless communication at a UE is described. The code may include instructions executable by a processor to receive, over a first component carrier, a first downlink grant for a first data transmission over a second component carrier, receive the first data transmission over the second component carrier using a first beam as a default beam, receive, over the first component carrier, a second downlink grant for a second data transmission over the second component carrier, select the first beam as the default beam for the second data transmission based on a receive time of the second data transmission occurring within a first threshold time window following the second downlink grant, and receive, based on the second downlink grant, the second data transmission over the second component carrier using the first beam as the default beam.

Some examples of the method, apparatuses, and non-transitory computer-readable medium described herein may further include operations, features, means, or instructions for receiving an indication of the first beam as the default beam for the first data transmission.

In some examples of the method, apparatuses, and non-transitory computer-readable medium described herein, the indication of the first beam may be received in connection with the first downlink grant.

In some examples of the method, apparatuses, and non-transitory computer-readable medium described herein, a receive time of the first data transmission occurs outside of the first threshold time window following the first downlink grant.

In some examples of the method, apparatuses, and non-transitory computer-readable medium described herein, the indication of the first beam may be received in connection with a radio resource control (RRC) message.

Some examples of the method, apparatuses, and non-transitory computer-readable medium described herein may further include operations, features, means, or instructions for determining that a receive time of the second downlink grant occurs after a second threshold time window following a receive time of the first data transmission, where selecting the first beam as the default beam may be further based on the determination.

Some examples of the method, apparatuses, and non-transitory computer-readable medium described herein may further include operations, features, means, or instructions for transmitting feedback information for the first data transmission, where the second threshold time window may be defined based on a transmit time of the feedback information.

A method of wireless communication at a UE is described. The method may include receiving a configuration message indicating a set of TCI states for downlink data transmissions to the UE, identifying one or more reference signals to monitor for beam failure detection based on the indicated set of TCI states, identifying one or more beam failure detection beams based on the indicated set of TCI states and the identified one or more reference signals, monitoring the identified one or more reference signals using the identified one or more beam failure detection beams, and selectively triggering a beam failure reporting procedure based on the monitoring.

An apparatus for wireless communication at a UE is described. The apparatus may include a processor, memory coupled to the processor, and instructions stored in the memory. The instructions may be executable by the processor to cause the apparatus to receive a configuration message indicating a set of TCI states for downlink data transmissions to the UE, identify one or more reference signals to monitor for beam failure detection based on the indicated set of TCI states, identify one or more beam failure detection beams based on the indicated set of TCI states and the identified one or more reference signals, monitor the identified one or more reference signals using the identified one or more beam failure detection beams, and selectively trigger a beam failure reporting procedure based on the monitoring.

Another apparatus for wireless communication at a UE is described. The apparatus may include means for receiving a configuration message indicating a set of TCI states for downlink data transmissions to the UE, identifying one or more reference signals to monitor for beam failure detection based on the indicated set of TCI states, identifying one or more beam failure detection beams based on the indicated set of TCI states and the identified one or more reference signals, monitoring the identified one or more reference signals using the identified one or more beam failure detection beams, and selectively triggering a beam failure reporting procedure based on the monitoring.

A non-transitory computer-readable medium storing code for wireless communication at a UE is described. The code may include instructions executable by a processor to receive a configuration message indicating a set of TCI states for downlink data transmissions to the UE, identify one or more reference signals to monitor for beam failure detection based on the indicated set of TCI states, identify one or more beam failure detection beams based on the indicated set of TCI states and the identified one or more reference signals, monitor the identified one or more reference signals using the identified one or more beam failure detection beams, and selectively trigger a beam failure reporting procedure based on the monitoring.

In some examples of the method, apparatuses, and non-transitory computer-readable medium described herein, identifying the one or more reference signals to monitor for beam failure detection may include operations, features, means, or instructions for identifying a reference signal type associated with each TCI state in the set of TCI states, and selecting, from the set of TCI states, a subset of TCI states for beam failure detection based on the reference signal type associated with each TCI state in the set of TCI states.

In some examples of the method, apparatuses, and non-transitory computer-readable medium described herein, determining the reference signal type associated with each TCI state in the set of TCI states may include operations, features, means, or instructions for determining that a TCI state in the set of TCI states may be associated with multiple reference signal types, and selecting, based on an entry associated with the TCI state, one of the reference signal types associated with the TCI state for use in selecting the subset of TCI states.

In some examples of the method, apparatuses, and non-transitory computer-readable medium described herein, the entry associated with the TCI state may be a Type D entry of the TCI state.

In some examples of the method, apparatuses, and non-transitory computer-readable medium described herein, selecting the subset of TCI states for beam failure detection may include operations, features, means, or instructions for determining an ascending or descending order of TCI states in the set of TCI states, and identifying a fixed number of TCI states for the subset of TCI states based on the ascending or descending order.

Some examples of the method, apparatuses, and non-transitory computer-readable medium described herein may further include operations, features, means, or instructions for identifying the one or more reference signals may be further based on an amount of repetition for a given reference signal type during the downlink data transmissions.

Some examples of the method, apparatuses, and non-transitory computer-readable medium described herein may further include operations, features, means, or instructions for identifying the one or more reference signals may be further based on a periodicity of a given reference signal type during the downlink data transmissions.

Some examples of the method, apparatuses, and non-transitory computer-readable medium described herein may further include operations, features, means, or instructions for identifying the one or more reference signals may be further based on a receive power associated with a given reference signal type.

A method of wireless communication at a base station is described. The method may include transmitting, over a first component carrier, a first downlink grant for a first data transmission over a second component carrier, transmitting the first data transmission over the second component carrier using a first beam as a default beam, transmitting, over the first component carrier, a second downlink grant for a second data transmission over the second component carrier, selecting the first beam as the default beam for the second data transmission based on a receive time of the second data transmission occurring within a first threshold time window following the second downlink grant, and transmitting, based on the second downlink grant, the second data transmission over the second component carrier using the first beam as the default beam.

An apparatus for wireless communication at a base station is described. The apparatus may include a processor, memory coupled to the processor, and instructions stored in the memory. The instructions may be executable by the processor to cause the apparatus to transmit, over a first component carrier, a first downlink grant for a first data transmission over a second component carrier, transmit the first data transmission over the second component carrier using a first beam as a default beam, transmit, over the first component carrier, a second downlink grant for a second data transmission over the second component carrier, select the first beam as the default beam for the second data transmission based on a receive time of the second data transmission occurring within a first threshold time window following the second downlink grant, and transmit, based on the second downlink grant, the second data transmission over the second component carrier using the first beam as the default beam.

Another apparatus for wireless communication at a base station is described. The apparatus may include means for transmitting, over a first component carrier, a first downlink grant for a first data transmission over a second component carrier, transmitting the first data transmission over the second component carrier using a first beam as a default beam, transmitting, over the first component carrier, a second downlink grant for a second data transmission over the second component carrier, selecting the first beam as the default beam for the second data transmission based on a receive time of the second data transmission occurring within a first threshold time window following the second downlink grant, and transmitting, based on the second downlink grant, the second data transmission over the second component carrier using the first beam as the default beam.

A non-transitory computer-readable medium storing code for wireless communication at a base station is described. The code may include instructions executable by a processor to transmit, over a first component carrier, a first downlink grant for a first data transmission over a second component carrier, transmit the first data transmission over the second component carrier using a first beam as a default beam, transmit, over the first component carrier, a second downlink grant for a second data transmission over the second component carrier, select the first beam as the default beam for the second data transmission based on a receive time of the second data transmission occurring within a first threshold time window following the second downlink grant, and transmit, based on the second downlink grant, the second data transmission over the second component carrier using the first beam as the default beam.

Some examples of the method, apparatuses, and non-transitory computer-readable medium described herein may further include operations, features, means, or instructions for transmitting an indication of the first beam as the default beam for the first data transmission.

In some examples of the method, apparatuses, and non-transitory computer-readable medium described herein, the indication of the first beam may be transmitted in connection with the first downlink grant.

In some examples of the method, apparatuses, and non-transitory computer-readable medium described herein, a receive time of the first data transmission occurs outside of the first threshold time window following the first downlink grant.

In some examples of the method, apparatuses, and non-transitory computer-readable medium described herein, the indication of the first beam may be transmitted in connection with a RRC message.

Some examples of the method, apparatuses, and non-transitory computer-readable medium described herein may further include operations, features, means, or instructions for determining that a receive time of the second downlink grant occurs after a second threshold time window following a receive time of the first data transmission, where selecting the first beam as the default beam may be further based on the determination.

Some examples of the method, apparatuses, and non-transitory computer-readable medium described herein may further include operations, features, means, or instructions for receiving feedback information for the first data transmission, where the second threshold time window may be defined based on a transmit time of the feedback information.

DETAILED DESCRIPTION

Figure 1:
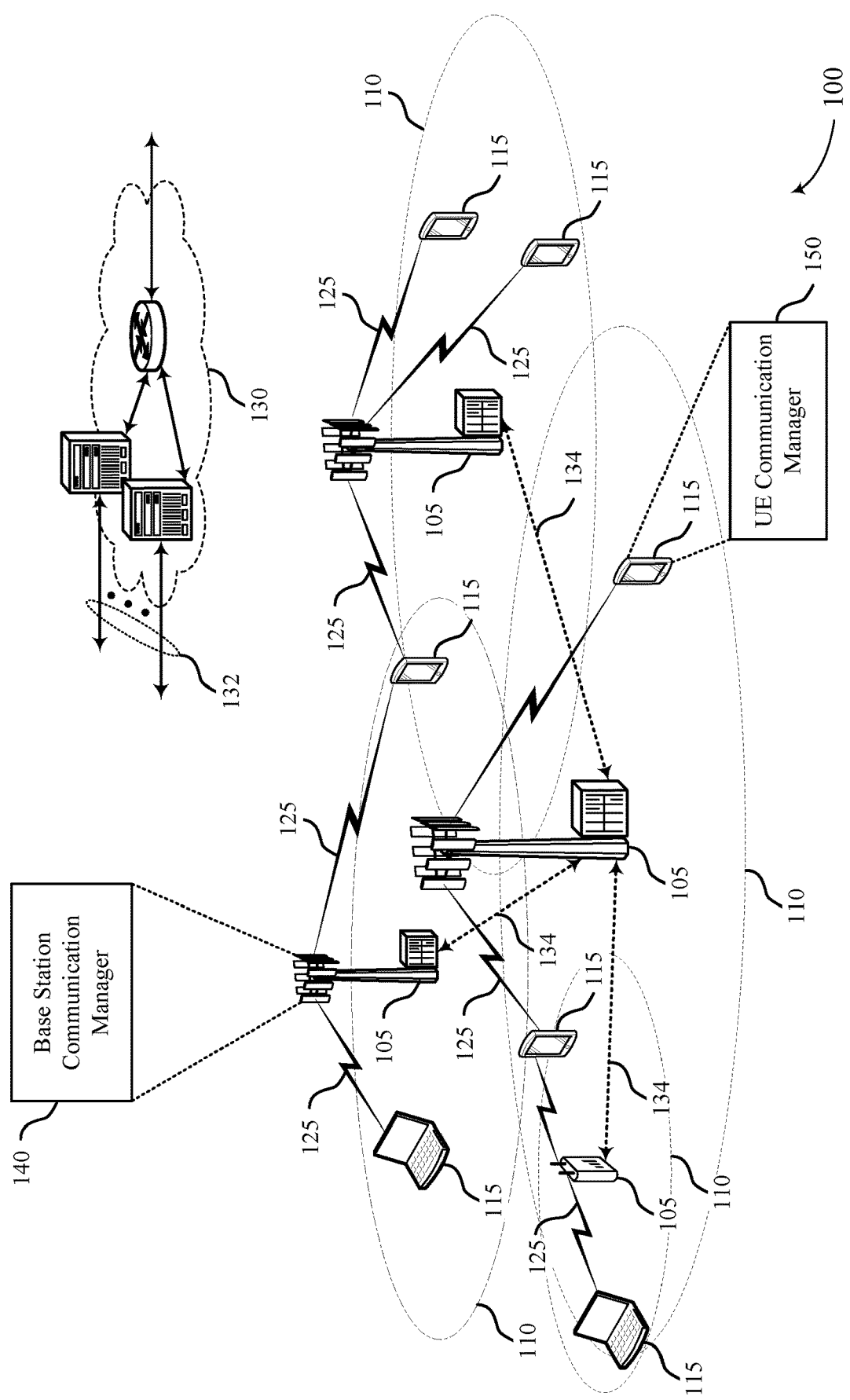
FIG. 1 illustrates an example of a wireless communications system that supports default beam identification and beam failure detection for cross carrier scheduling in accordance with aspects of the present disclosure.

In some cases, a UE may perform communications with a base station using a default beam. The UE may determine the default beam from a previously received (e.g., the last received) PDCCH and may use a default beam to receive a PDSCH transmission from the base station. In cases where a time $k_0$ between receiving a PDCCH transmission and receiving a PDSCH transmission is less than a threshold, the UE may assume that the default beam is a lowest CORESET ID of a previous slot (e.g., the latest slot).

The UE may, additionally or alternatively, perform BFD with the base station. For instance, the UE may perform BFD based on a BFD set which may contain RRC-configured reference signals or reference signals linked to CORESETs being monitored. Reference signals configured by RRC may be semi-statically configured, while reference signals linked to CORESETs may be dynamically configured. The UE may monitor the reference signals and may determine beam failure has occurred if a block error rate (BLER) associated with each reference signal is larger than an out-of-sync (OOS) BLER. As such, default beam determination (e.g., for when a PDSCH transmission is received before a corresponding PDCCH transmission is processed) and/or dynamic BFD updating may rely on CORESETs.

In some cases (e.g., cross-carrier scheduling), however, a CORESET may not be available to a UE. Cross-carrier scheduling may, for instance, involve a UE receiving a PDCCH transmission with a first component carrier and receiving a PDSCH transmission with a second component carrier. The second component carrier, however, may not be associated with a CORESET. As such, when a PDSCH transmission is received before a PDCCH transmission is decoded, the UE may not be able to rely on the lowest CORESET ID of a previous slot in the component carrier (e.g., the latest slot). Additionally or alternatively, the UE may not be able to link the reference signals of the BFD set to a CORESET to be monitored, as the PDSCH of the second component carrier may not be associated with a CORESET. As such, dynamic updating of the BFD, such as through linking reference signals to CORESETs, may not be readily achievable through current methods.

In order to determine a default beam when a CORESET is unavailable (e.g., during cross-carrier scheduling), a UE may decode a downlink grant, such as a PDCCH transmission, and determine a default beam based on a previous cross-carrier scheduled data transmission beam, such as a PDSCH beam. For instance, the UE may determine a beam used previously to transmit the data transmission (e.g., a PDSCH transmission) in the second component carrier and may use the beam to receive a next data transmission if the next data transmission is received within a threshold time window after receiving a next downlink grant (e.g., if the next data transmission is received before the next downlink grant has been processed). Additionally or alternatively, the UE may receive an indication of the initial default beam from a base station (e.g., RRC signaling) that may indicate which default beam the UE is to use for receiving a next data transmission. Additionally or alternatively, the UE may wait to use to use the previous cross-carrier scheduled data transmission beam until a second threshold time window has elapsed. For instance, the UE may wait until the UE has transmitted feedback information (e.g., an acknowledgement (ACK) or non-acknowledgement (NACK)) in response to receiving the PDSCH transmission.

In order to perform BFD when a CORESET is not available (e.g., during cross-carrier scheduling), a UE may rely on a configuration message (e.g., a medium access control (MAC) control element (MAC-CE)) indicating a set of downselected TCI states. The UE may use the TCI states to update a BFD set, where the BFD set may be comprised of a quantity of reference signals from the downselected TCI states. To choose which reference signals are to be used in the BFD set, the UE may apply one or more rules. For instance, the reference signals may be chosen based on which reference signals have the lowest periodicity, which reference signals have the largest reference signal received power (RSRP), the order of the downselected TCI states, the quasi-co location (QCL) type of a reference signal, or a combination. In some cases, repeats of reference signals among the downselected TCI states may be removed from consideration. After updating the BFD set, the UE may monitor BFD beams associated with each reference signal of the BFD set and may selectively trigger a beam failure reporting procedure (e.g., beam recovery) if the UE determines beam failure has occurred.

Aspects of the disclosure are initially described in the context of a wireless communications system. Aspects of the disclosure are additionally described in the context of an additional wireless communications system, cross-carrier configurations, and process flows. Aspects of the disclosure are further illustrated by and described with reference to apparatus diagrams, system diagrams, and flowcharts that relate to default beam identification and beam failure detection for cross carrier scheduling.

FIG. 1 illustrates an example of a wireless communications system 100 that supports default beam identification and beam failure detection for cross carrier scheduling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARM) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. In some examples, a threshold time window may be determined based at least in part on the subcarrier spacing. Further, some wireless communications systems may implement slot aggregation in which multiple slots or mini-slots are aggregated together and used for communication between a UE 115 and a base station 105.

The term "carrier" or "component carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 may include a UE communication manager 150 that may receive a PDCCH transmission and decode the PDCCH transmission to determine a default beam over which to receive a corresponding PDSCH transmission. This determination may involve identifying a TCI state of the PDCCH transmission. However, in some cases, the UE 115 may receive the PDSCH transmission before the UE 115 is able to decode the PDCCH transmission. In such cases, the UE communication manager 150 may assume that that the default beam is a lowest CORESET ID of a previous slot (e.g., the latest slot).

Additionally or alternatively, the UE communication manager 150 may perform BFD. Beam failure may occur whenever channel conditions are poor and the UE 115 is incapable of or impeded from receiving information from a transmitter (e.g., a transmitter of a base station 105). The UE communication manager 150 may monitor a set of beams contained with a BFD set which may be RRC or linked to CORESET beams (e.g., dynamically updated). The UE communication manager 150 may trigger a beam failure recovery (BFR) procedure when the beams of the BFD set fail (e.g., when all beams of the BFD set have a BLER greater than an 00S BLER).

Either or both of determining a default beam and BFD may involve using a CORESET. However, if the UE 115 and corresponding base station are acting according to cross-carrier scheduling (e.g., between FR1 and FR2), the cross carrier scheduled component carrier may not have a CORESET. For instance, a default beam of a lowest CORESET ID of a previous slot may be configured to operate within a component carrier associated with a PDCCH transmission (e.g., FR1), but may not be configured to operate within a different component carrier (e.g., FR2). As such, the UE 115 may fail to perform default beam determination and BFD by conventional methods.

Wireless communications system 100 may support efficient techniques for default beam identification and beam failure detection for cross carrier scheduling. For instance, a UE 115 may receive, over a first component carrier and from a base station 105, a first downlink grant (e.g., a PDCCH transmission) for a first data transmission (e.g., a PDSCH transmission) over a second component carrier. The UE 115 may receive, from the base station 105, the first data transmission over the second component carrier using a first beam as a default beam. The UE 115 may receive, over the first component carrier and from the base station 105, a second downlink grant for a second data transmission over the second component carrier. The UE 115, through UE communication manager 150 for example, may select the first beam as the default beam for the second data transmission based on a receive time of the second data transmission occurring within a first threshold time window following the second downlink grant. The UE 115 may receive, based on the second downlink grant and from the base station 105, the second data transmission over the second component carrier using the first beam as the default beam.

The methods disclosed herein may enable a UE 115 to determine a default beam when a CORESET is not available, such as when the UE 115 is participating in cross-carrier scheduling. Further, reusing a first beam as a default beam for a second data transmission may enable a UE 115 to receive a PDSCH without first processing a corresponding PDCCH. Receiving a default beam through RRC signaling may enable an initial PDSCH transmission to be received within a threshold time window after receiving the initial PDCCH transmission. Determining a default beam from a PDCCH, meanwhile, may enable a UE 115 to determine a default beam without relying on receiving additional signaling.

Additionally or alternatively, a UE 115 may receive, from a base station 105, a configuration message (e.g., a MAC-CE) indicating a set of TCI states for downlink data transmissions (e.g., a PDSCH transmission) to the UE 115. The UE 115 may identify one or more reference signals to monitor for BFD based on the indicated set of TCI states. The UE 115 may identify one or more BFD beams based on the indicated set of TCI states and the identified one or more reference signals. The UE 115 may monitor the identified one or more reference signals using the identified one or more beam failure detection beams. The UE 115 may selectively trigger a beam failure reporting procedure (e.g., beam recovery) based on the monitoring.

The methods disclosed herein may enable a UE 115 to perform BFD when a CORESET is not available, such as when the UE 115 is participating in cross-carrier scheduling. As such, the methods disclosed herein may enable the UE 115 to dynamically update a set of reference signals and corresponding BFD beams when a CORESET is not available. In some cases, choosing the reference signals from a downselected subset of TCI states with the lowest periodicity may enable the UE 115 to speed up BFD determination, as reference signals with lower periodicity may arrive at the UE 115 more often. Additionally or alternatively, choosing the reference signals from a downselected subset of TCI states with the largest RSRP may enable more accuracy in determining that all possible reference signals of the downselected subset have failed (e.g., if reference signals with the largest RSRPs fails, the reference signals with smaller RSRPs may have also failed)

In some cases, a base station 105 may include a base station communication manager 140 that may cause a transmitter of the base station to transmit, over a first component carrier, a first downlink grant for a first data transmission over a second component carrier. The base station communication manager 140 may cause the transmitter to transmit, over a first component carrier, a first downlink grant for a first data transmission over a second component carrier, and transmit the first data transmission over the second component carrier using a first beam as a default beam. The base station communication manager 140 may cause the transmitter to transmit, over the first component carrier, a second downlink grant for a second data transmission over the second component carrier. The base station communication manager 140 may select the first beam as the default beam for the second data transmission based at least in part on a receive time of the second data transmission occurring within a first threshold time window following the second downlink grant. The base station communication manager 140 may cause the transmitter to transmit, based at least in part on the second downlink grant, the second data transmission over the second component carrier using the first beam as the default beam.

Figure 2:
FIG. 2 illustrates an example of a wireless communications system that supports default beam identification and beam failure detection for cross carrier scheduling in accordance with aspects of the present disclosure.
Figure 2:
Figure 2:
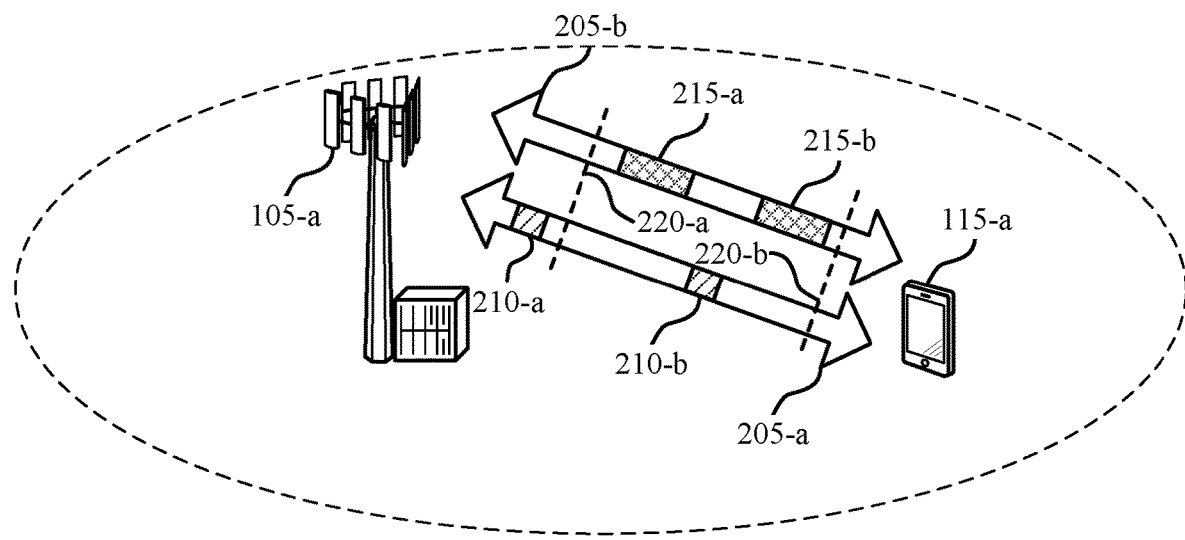

FIG. 2 illustrates an example of a wireless communications system 200 that supports default beam identification and beam failure detection for cross carrier scheduling in accordance with aspects of the present disclosure. In some examples, wireless communications system 200 may implement aspects of wireless communications system 100. For instance, wireless communications system 200 may include UE 115-a and base station 105-a, which may be examples of a UE 115 and a base station 105, respectively, as described with reference to FIG. 1. Base station 105-a may serve a cell with a coverage area 110-a.

Base station 105-a may communicate with UE 115-a over component carriers 205-a and 205-b. Component carrier 205-a may represent a first frequency range (e.g., FR1) and component carrier 205-a may represent a second frequency range (e.g., FR2). Component carrier 205-a may carry one or more PDCCH transmissions 210 scheduling one or more PDSCH transmissions 215 in component carrier 205-b. For instance, component carrier 205-a may carry a first PDCCH transmission 210-a which may schedule a first PDSCH transmission 215-a within component carrier 205-b and may carry a second PDCCH transmission 210-b which may schedule a second PDSCH transmission 215-b.

UE 115-a, upon receiving PDCCH transmission 210-a, may decode PDCCH transmission 210-a and use information (e.g., TCI state information) from the PDCCH transmission 210-a to determine a default beam upon which to receive PDSCH transmission 215-a. In order to decode PDCCH transmission 210-a and use its information to receive PDSCH transmission 215-a, UE 115-a may receive PDSCH transmission 215-a after a threshold time 220-a (e.g., $k_0$), which may represent a time at which base station 105-a infers that UE 115-a has processed PDCCH transmission 210-a. In other cases, UE 115-a may receive RRC signaling (e.g., from base station 105-a) that specifies the default beam. In such cases, UE 115-a may receive PDSCH transmission 215-a before threshold time 220-a has elapsed and may use the default beam to receive PDSCH transmission 215-a.

UE 115-a may receive second PDCCH transmission 210-b after receiving first PDCCH transmission 210-a. However, UE 115-a may receive PDSCH transmission 215-b before UE 115-a is able to process PDCCH transmission 210-b (e.g., before threshold time 220-b has elapsed). In such cases, base station 105-a may use the default beam indicated in PDCCH transmission 210-a or specified via RRC signaling. After PDCCH transmission 210-b is decoded, UE 115-a may determine a new default beam to use if a next PDSCH transmission 215 is received before a next PDCCH transmission 210 is processed. Additionally or alternatively, UE 115-a may continue to use the default beam indicated in PDCCH transmission 210-a or specified via RRC signaling.

In some cases, UE 115-a may determine the default beam (e.g., for receiving PDSCH transmissions 215) via virtual CORESETs and/or virtual search spaces. Virtual CORESETs and/or virtual search spaces may give TCI state information, but may not include a PDCCH transmission to be monitored (e.g., the number of PDCCH transmissions to be monitored may be 0). The TCI state of the virtual CORESETs may be updated via MAC-CE in a dynamic manner. Additionally or alternatively, in the absence of CORESETs, virtual CORESETs may be configured to be used for determination of BFD sets.

In some cases, UE 115-a may perform BFD determination by using PDSCH TCI states. For instance, UE 115—may use up to a certain number (e.g., 128) of TCI states to receive a PDSCH transmission 215, from which MAC-CE may downselect a subset (e.g., 8). As such, UE 115-a may assume that the BFD set consists of one or more TCI states from the downselected subset. The cardinality of the BFD set may be constrained to be smaller than M (e.g., 2). As such, UE 115-a may consult a set of rules to determine which reference signals of the TCI states of the downselected subset the BFD set is to include (e.g., which 2 TCI states of the 8 MAC-CE downselected TCI states are to be included).

For instance, UE 115-a may determine the M reference signals based on an order (e.g., ascending or descending order) of the TCI states of the downselected subset. For instance, if TCI states with IDs 4, 8, 15, 16, 23, and 42 are included in the downselected subset and assuming M=2, UE 115-a may determine that reference signals from TCI states 4 and 8 or that reference signals from TCI states 23 and 42 are to be included in the BFD set. Additionally or alternatively, if two reference signals are present in a TCI state whose reference signal is to be included in a BFD set, a reference signal may be chosen based on the QCL type the reference signal is associated with. For instance, if UE 115-a is to choose a reference signal of TCI state 4 for the BFD set and TCI state 4 includes 2 reference signals, UE 115-a may choose the reference signal associated with QCL type D. Additionally or alternatively, any reference signals among the TCI states of the downselected subset which are repeats of another reference signal among the TCI state of the downselected subset may be removed from consideration, which may leave one copy left for consideration. Additionally or alternatively, UE 115-a may choose the M reference signals from the downselected subset of TCI states with the lowest periodicity. Additionally or alternatively, UE 115-a may choose the M reference signals from the downselected subset of TCI states with the largest RSRP.

Figure 3:
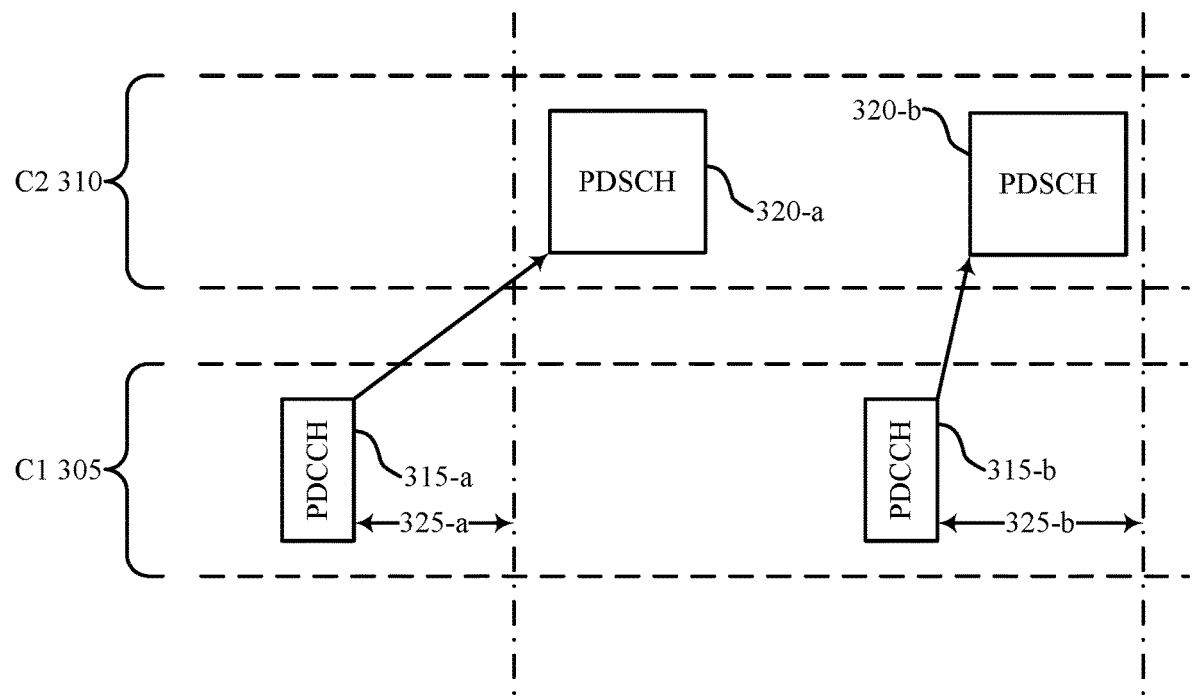
FIG. 3 illustrates an example of a cross-carrier configuration that supports default beam identification and beam failure detection for cross carrier scheduling in accordance with aspects of the present disclosure.

FIG. 3 illustrates an example of a cross-carrier configuration 300 that supports default beam identification and beam failure detection for cross carrier scheduling in accordance with aspects of the present disclosure. In some examples, cross-carrier configuration 300 may implement aspects of wireless communications systems 100 and/or 200. For instance, cross-carrier configuration may be a configuration of a UE 115 and/or a base station 105 as described with reference to FIGS. 1 and/or 2.

Cross carrier configuration 300 may include a first component carrier, C1 305, and a second component carrier, C2 310. C1 305 may be at a lower frequency range than C2 310. Additionally or alternatively, C1 305 may represent a sub-6 GHz band (e.g., FR1) and C2 310 may represent a band above 6 GHz (e.g., FR2). C1 305 may carry one or more PDCCH transmissions 315 and C2 310 may carry one or more PDSCH transmissions 320. Each PDCCH transmission 315 may schedule a corresponding PDSCH transmission 320. For instance, PDCCH transmission 315-a may schedule PDSCH transmission 320-a and PDCCH transmission 315-b may schedule PDSCH transmission 320-b. A UE 115 may receive PDSCH transmission 320-a after threshold time window 325-a has elapsed and may receive PDSCH transmission 320-b before threshold time window 325-b has elapsed. In some cases, all of PDSCH transmission 320-b may be contained with threshold time window 325-b. In other cases, a portion of PDSCH transmission 320-b may be received within threshold time window 325-b and a portion may be received after. Although each threshold time window 325 is drawn starting from an end of a PDCCH transmission 315, threshold time window 325 may, alternatively, be defined to start at the beginning or anywhere within the time spanned by a corresponding PDCCH transmission 315.

After a UE 115 receives PDCCH transmission 315-a, the UE 115 may process PDCCH transmission 315-a over threshold time window 325-a. Upon processing PDCCH transmission 315-*a*, the UE 115 may obtain information related to a default beam. After obtaining the default beam information, UE 115 may use the default beam to receive PDSCH transmission 320-*a*. After the UE 115 receives PDCCH transmission 315-*b*, the UE 115 may begin processing PDCCH transmission 315-*b*. However, the UE 115 may begin receiving PDSCH transmission 320-*b* before threshold time window 325-*b* has elapsed. As such, the UE 115 may use the default beam that the UE 115 used to receive PDSCH transmission 320-*a* to receive PDSCH transmission 320-*b*. Upon processing PDCCH transmission 315-*b*, the UE 115 may update the default beam in line with the default beam information of PDCCH transmission 315-*b*. If the next PDSCH transmission 320 is received before a next threshold time window 325 after a next PDCCH transmission 315, the UE 115 may use the updated default beam to receive the next PDSCH transmission 320. Elsewise, the UE 115 may use the default beam specified by the next PDCCH transmission 315.

Figure 4:
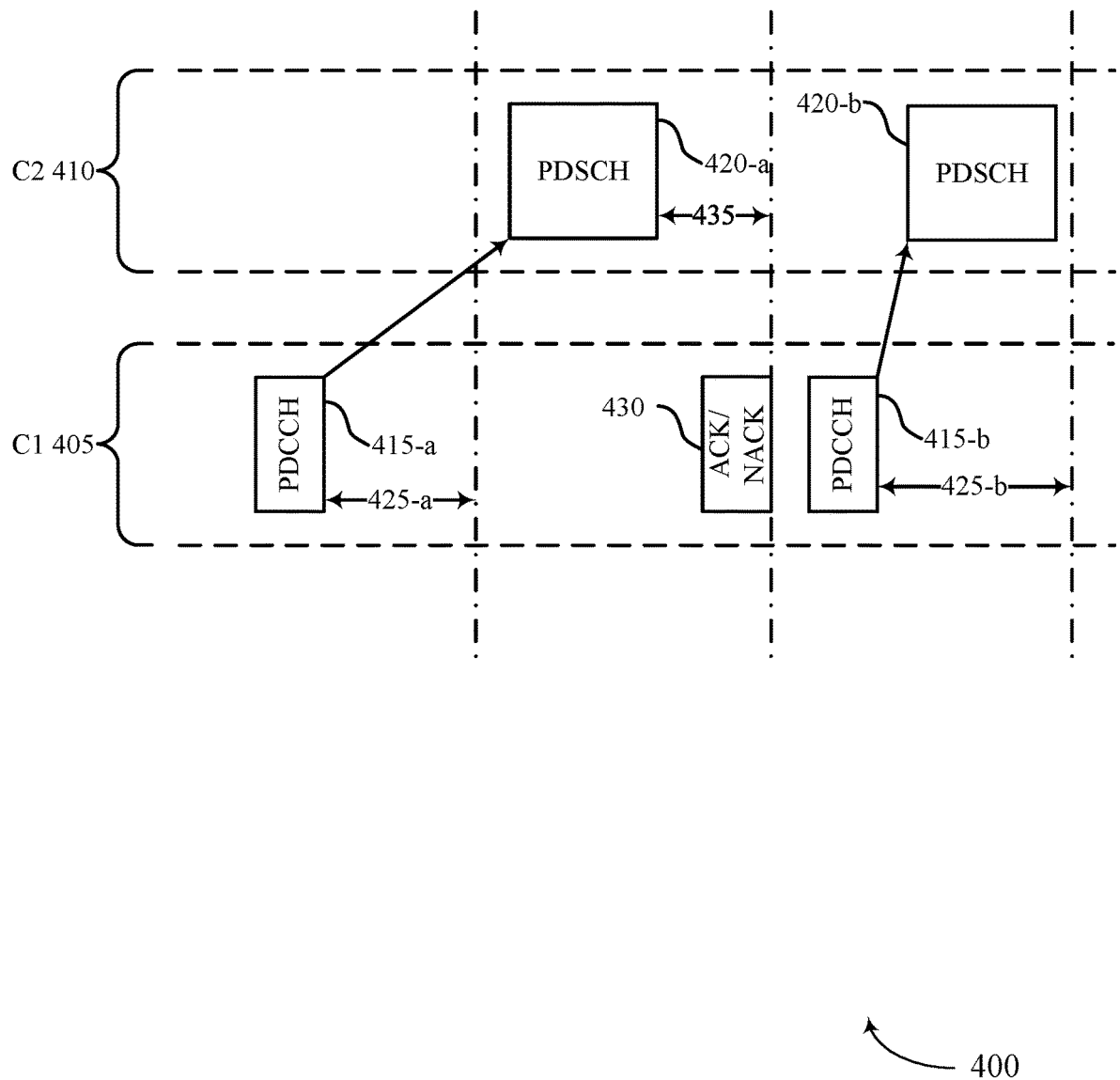
FIG. 4 illustrates an example of a cross-carrier configuration that supports default beam identification and beam failure detection for cross carrier scheduling in accordance with aspects of the present disclosure.

FIG. 4 illustrates an example of a cross-carrier configuration 400 that supports default beam identification and beam failure detection for cross carrier scheduling in accordance with aspects of the present disclosure. In some examples, cross-carrier configuration 400 may implement aspects of wireless communications systems 100 and/or 200. For instance, cross-carrier configuration may be a configuration of a UE 115 and/or a base station 105 as described with reference to FIGS. 1 and/or 2.

Cross carrier configuration 400 may include a first component carrier, C1 405, and a second component carrier, C2 410. C1 405 may be at a lower frequency range than C2 410. Additionally or alternatively, C1 405 may represent a sub-6 GHz band (e.g., FR1) and C2 410 may represent a band above 6 GHz (e.g., FR2). C1 405 may carry one or more PDCCH transmissions 415 and C2 410 may carry one or more PDSCH transmissions 420. Each PDCCH transmission 415 may schedule a corresponding PDSCH transmission 420. For instance, PDCCH transmission 415-*a* may schedule PDSCH transmission 420-*a* and PDCCH transmission 415-*b* may schedule PDSCH transmission 420-*b*. A UE 115 may receive PDSCH transmission 420-*a* after threshold time window 425-*a* has elapsed and may receive PDSCH transmission 420-*b* before threshold time window 425-*b* has elapsed. In some cases, all of PDSCH transmission 420-*b* may be contained with threshold time window 425-*b*. In other cases, a portion of PDSCH transmission 420-*b* may be received within threshold time window 425-*b* and a portion may be received after. Although each threshold time window 425 is drawn starting from an end of a PDCCH transmission 415, threshold time window 425 may, alternatively, be defined to start at the beginning or anywhere within the time spanned by a corresponding PDCCH transmission 415.

Additionally or alternatively, C1 405 may carry feedback information 430, which may consist of an ACK (e.g., if the UE 115 successfully decoded PDSCH transmission 420-*a*) or a NACK (e.g., if the UE 115 failed to decode PDSCH transmission 420-*a*). A threshold time window 435 may occur between receiving PDSCH transmission 420-*a* and transmitting feedback information 430. Although each threshold time window 435 is drawn starting from an end of a PDSCH transmission 420, threshold time window 435 may, alternatively, be defined to start at the beginning or anywhere within the time spanned by a corresponding PDSCH transmission 420. Additionally or alternatively, although each threshold time window 435 is drawn ending from an end of feedback information 430, threshold time window 435 may, alternatively, be defined to end at the beginning or anywhere within the time spanned by feedback information 430.

After a UE 115 receives PDCCH transmission 415-*a*, the UE 115 may process PDCCH transmission 415-*a* over threshold time window 425-*a*. Upon processing PDCCH transmission 415-*a*, the UE 115 may obtain information related to a default beam. After obtaining the default beam information, UE 115 may use the default beam to receive PDSCH transmission 420-*a*. UE 115 may attempt to decode PDSCH transmission 420-*a* over threshold time window 435 and may transmit feedback information 430. After transmitting feedback information 430, the UE 115 may receive and begin processing PDCCH transmission 415-*b*. However, the UE 115 may begin receiving PDSCH transmission 420-*b* before threshold time window 425-*b* has elapsed. As such, the UE 115 may use the default beam that the UE 115 used to receive PDSCH transmission 420-*a* to receive PDSCH transmission 420-*b*. Upon processing PDCCH transmission 425-*b*, the UE 115 may update the default beam in line with the default beam information of PDCCH transmission 415-*b*. If the next PDSCH transmission 420 is received before a next threshold time window 425 after a next PDCCH transmission 415, the UE 115 may use the updated default beam to receive the next PDSCH transmission 420. Elsewise, the UE 115 may use the default beam specified by the next PDCCH transmission 415.

Figure 5:
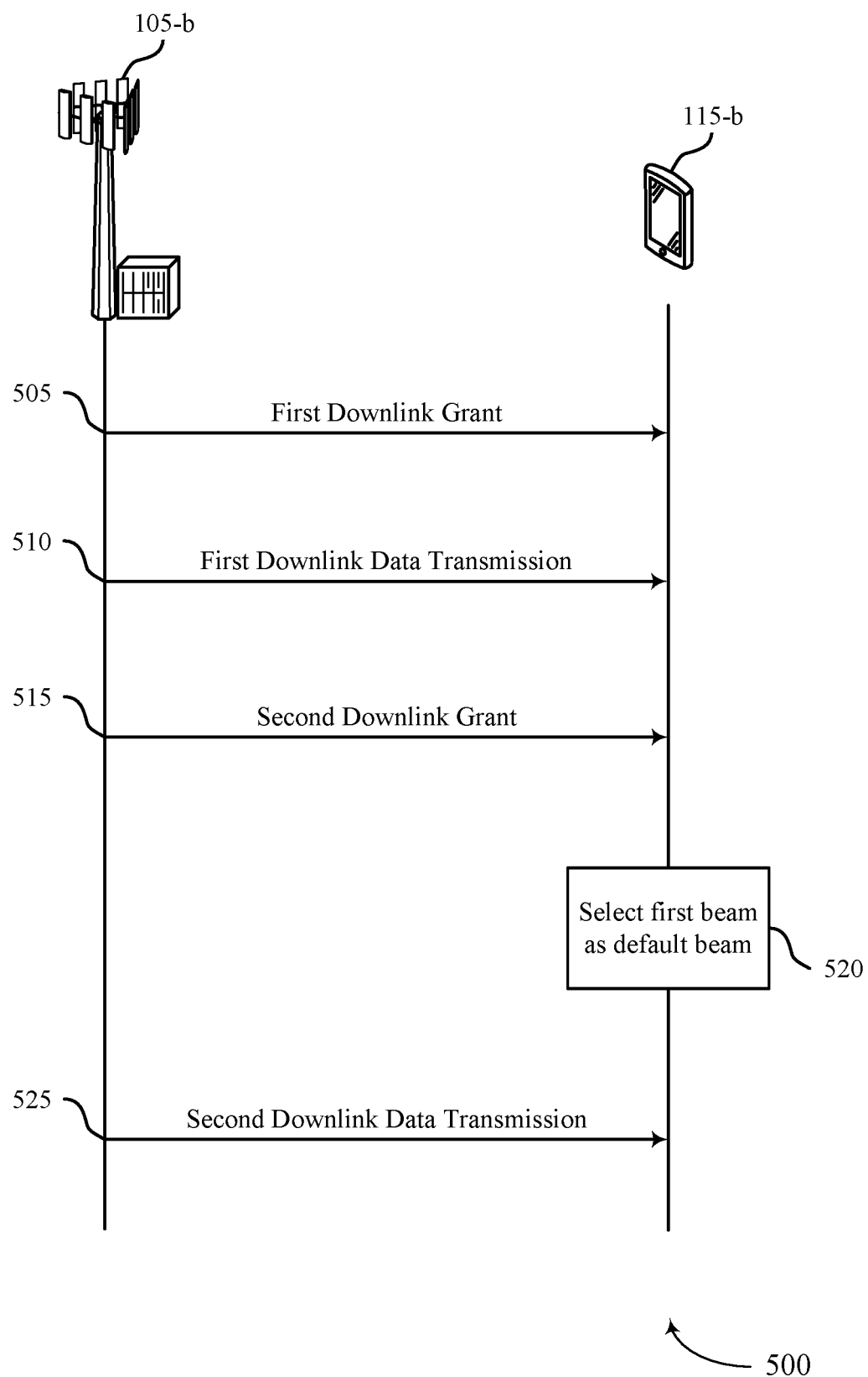
FIG. 5 illustrates an example of a process flow that supports default beam identification and beam failure detection for cross carrier scheduling in accordance with aspects of the present disclosure.

FIG. 5 illustrates an example of a process flow 500 that supports default beam identification and beam failure detection for cross carrier scheduling in accordance with aspects of the present disclosure. In some examples, process flow 500 may implement aspects of wireless communications systems 100 and/or 200. For instance, process flow 500 may include UE 115-*b* and base station 105-*b*, which may be examples of aspects of a UE 115 and a base station 105, respectively, as described with reference to FIGS. 1 and/or 2.

At 505, base station 105-*b* may transmit, over a first component carrier (e.g., FR1), a first PDCCH transmission for a first PDSCH transmission over a second component carrier (e.g., FR2). UE 115-*b* may receive the first PDCCH transmission. In some cases, base station 105-*b* may transmit an indication of a first beam as a default beam for the first PDSCH transmission, where the indication of the first beam may be received in connection with the first PDCCH transmission or an RRC message. If the indication is in connection with the first PDCCH transmission, UE 115-*b* may receive the indication by decoding or otherwise processing the first PDCCH transmission.

At 510, base station 105-*b* may transmit the first PDSCH transmission over the second component carrier. UE 115-*b* may receive the first PDSCH transmission using a first beam as a default beam, such as the first beam indicated by the transmitted indication.

At 515, base station 105-*b* may transmit, over the first component carrier, a second PDCCH transmission for a second PDSCH transmission over the second component carrier. UE 115-*b* may receive the second PDCCH transmission.

At 520, UE 115-*b* may select the first beam as the default beam for the second PDSCH transmission. UE 115-*b* may make such a selection based on a receive time of the second PDSCH transmission occurring within a first threshold time window following the second PDCCH transmission. The first threshold time window may be, for instance, a time to process the second PDCCH transmission. In some cases, a receive time of the first PDSCH transmission may occur outside of the first threshold time window. In some cases, UE 115-*b* may determine that a receive time of the second PDCCH transmission occurs after a second threshold time window following a receive time of the first PDSCH transmission. Additionally or alternatively, UE 115-*b* may transmit feedback information (e.g., an ACK or NACK) for the first PDSCH transmission. In some cases, the second threshold window may be a time duration between a receive time of the PDSCH transmission to a transmit time of the feedback information.

At 525, base station 105-*b* may transmit the second PDSCH transmission over the second component carrier using the first beam as the default beam. UE 115-*b* may receive the second PDSCH transmission based on the second PDCCH transmission.

Figure 6:
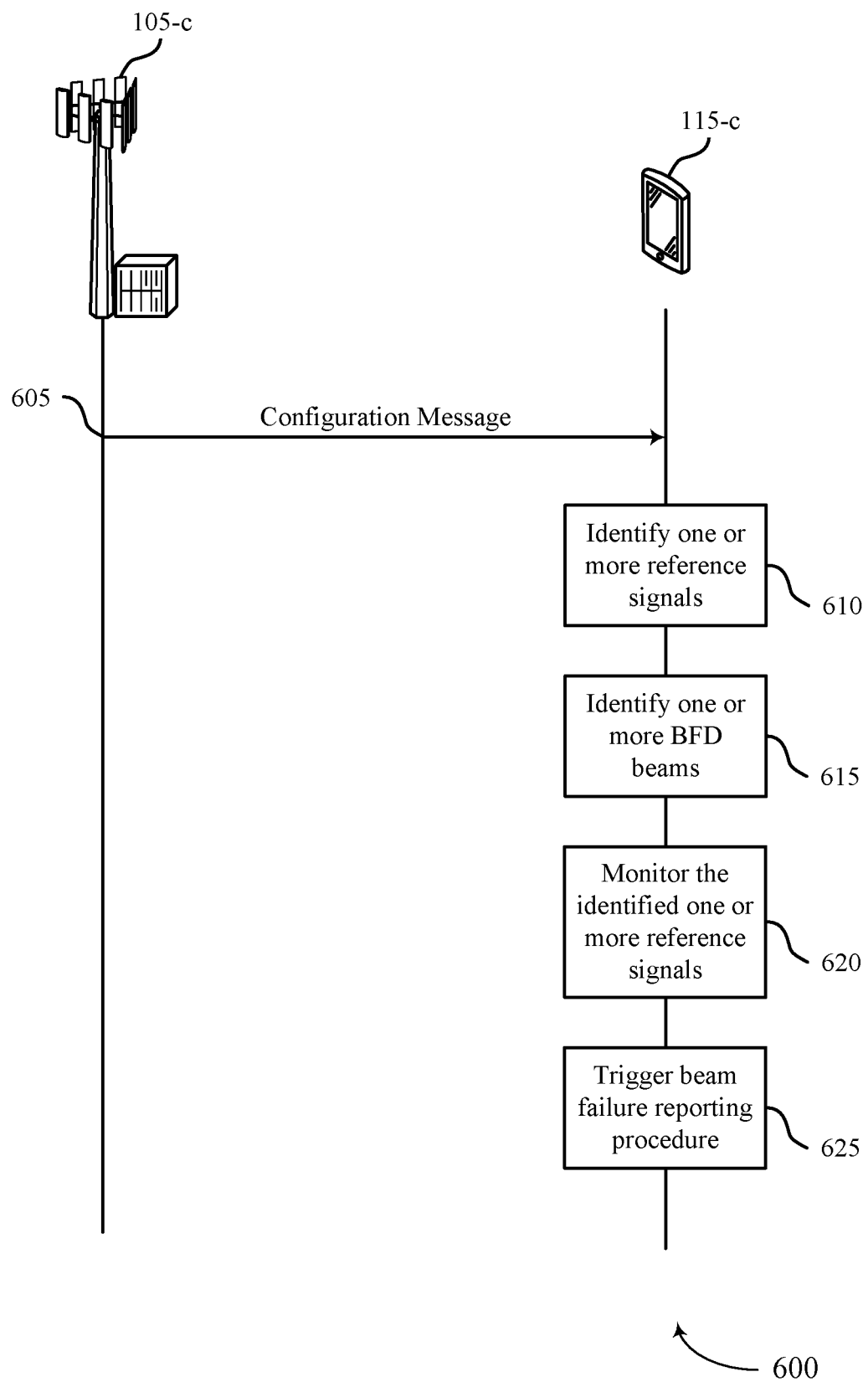
FIG. 6 illustrates an example of a process flow that supports default beam identification and beam failure detection for cross carrier scheduling in accordance with aspects of the present disclosure.

FIG. 6 illustrates an example of a process flow 600 that supports default beam identification and beam failure detection for cross carrier scheduling in accordance with aspects of the present disclosure. In some examples, process flow 600 may implement aspects of wireless communications systems 100 and/or 200. For instance, process flow 600 may include UE 115-*c* and base station 105-*c*, which may be examples of aspects of a UE 115 and a base station 105, respectively, as described with reference to FIGS. 1 and/or 2.

At 605, base station 105-*c* may transmit a configuration message (e.g., a MAC-CE) indicating a set of TCI states for downlink PDSCH transmissions. UE 115-*c* may receive the configuration message.

At 610, UE 115-*c* may identify one or more reference signals (e.g., CRS, DM-RS, CSI-RS) to monitor for BFD. UE 115-*c* may identify the one or more signals based on the indicated set of TCI states. For instance, UE 115-*c* may update a BFD set that is to contain the one or more reference signals. In on example, UE 115-*c* may identify a reference signal type (e.g., a CRS, DM-RS, CSI-RS) associated with each TCI state in the set of TCI states and may select, from the set of TCI states, a subset of TCI states for BFD based on the reference signal type associated with each TCI state of the set of TCI states. In some cases, UE 115-*c* may determine that a TCI state in the set of TCI states is associated with multiple reference signal types and may select, based on an entry associated with the TCI state (e.g., a QCL type, such as Type D), one of the reference signal types associated with the TCI state (e.g., for use in selecting the subset of TCI states. In some cases, selecting the subset of TCI states includes determining an ascending or descending order of TCI states (e.g., TCI states with IDs 4, 8, 15, 16, 23, 42) in the set of TCI states and identifying a fixed number of TCI states for the subset of TCI states based on the ascending (e.g., TCI state with ID 4 may be chosen) or descending order (e.g., TCI state with ID 42 may be chosen). In some cases, the one or more reference signals may be identified based on an amount of repetition of a given reference signal type during the PDSCH transmissions, a periodicity of a given reference signal type, a receive power associated with a reference signal type, or a combination of these.

At 615, UE 115-*c* may identify one or more BFD detection beams. UE 115-*c* may identify the one or more BFD detection beams based on the identified TCI states and the identified one or more reference signals.

At 620, UE 115-*c* may monitor the identified one or more reference signals using the identified one or more beam failure detection beams.

At 625, UE 115-*c* may selectively trigger a beam failure reporting procedure (e.g., beam recovery) based on the monitoring.

Figure 7:
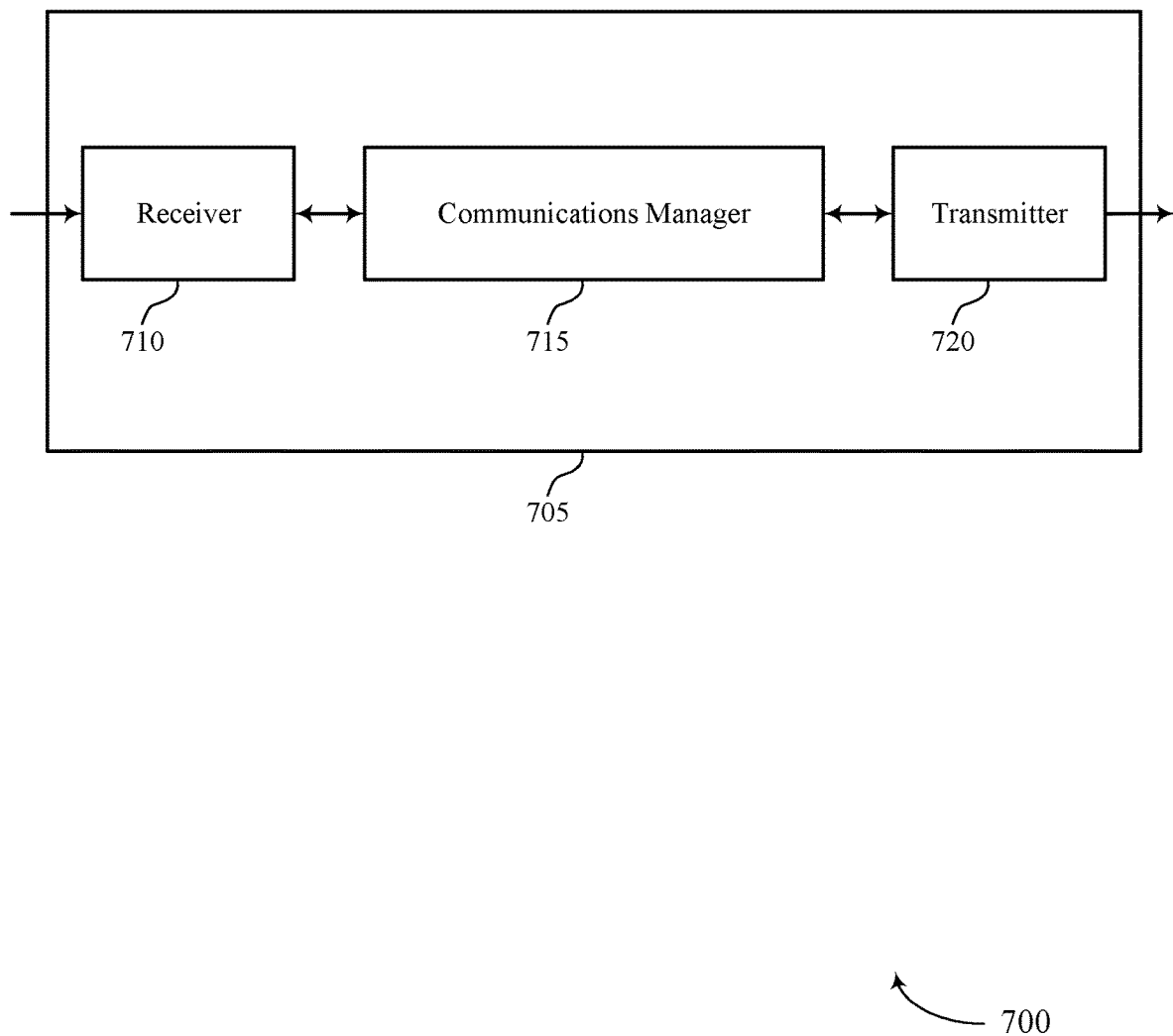
FIGS. 7 and 8 show block diagrams of devices that support default beam identification and beam failure detection for cross carrier scheduling in accordance with aspects of the present disclosure.

FIG. 7 shows a block diagram 700 of a device 705 that supports default beam identification and beam failure detection for cross carrier scheduling in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to default beam identification and beam failure detection for cross carrier scheduling, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, over a first component carrier, a first downlink grant for a first data transmission over a second component carrier, receive, over the first component carrier, a second downlink grant for a second data transmission over the second component carrier, receive the first data transmission over the second component carrier using a first beam as a default beam, receive, based on the second downlink grant, the second data transmission over the second component carrier using the first beam as the default beam, and select the first beam as the default beam for the second data transmission based on a receive time of the second data transmission occurring within a first threshold time window following the second downlink grant. The communications manager 715 may also receive a configuration message indicating a set of TCI states for downlink data transmissions to the UE, identify one or more reference signals to monitor for beam failure detection based on the indicated set of TCI states, identify one or more beam failure detection beams based on the indicated set of TCI states and the identified one or more reference signals, monitor the identified one or more reference signals using the identified one or more beam failure detection beams, and selectively trigger a beam failure reporting procedure based on the monitoring. The communications manager 715 may be an example of aspects of the communications manager 1010 or the UE communications manager 150 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
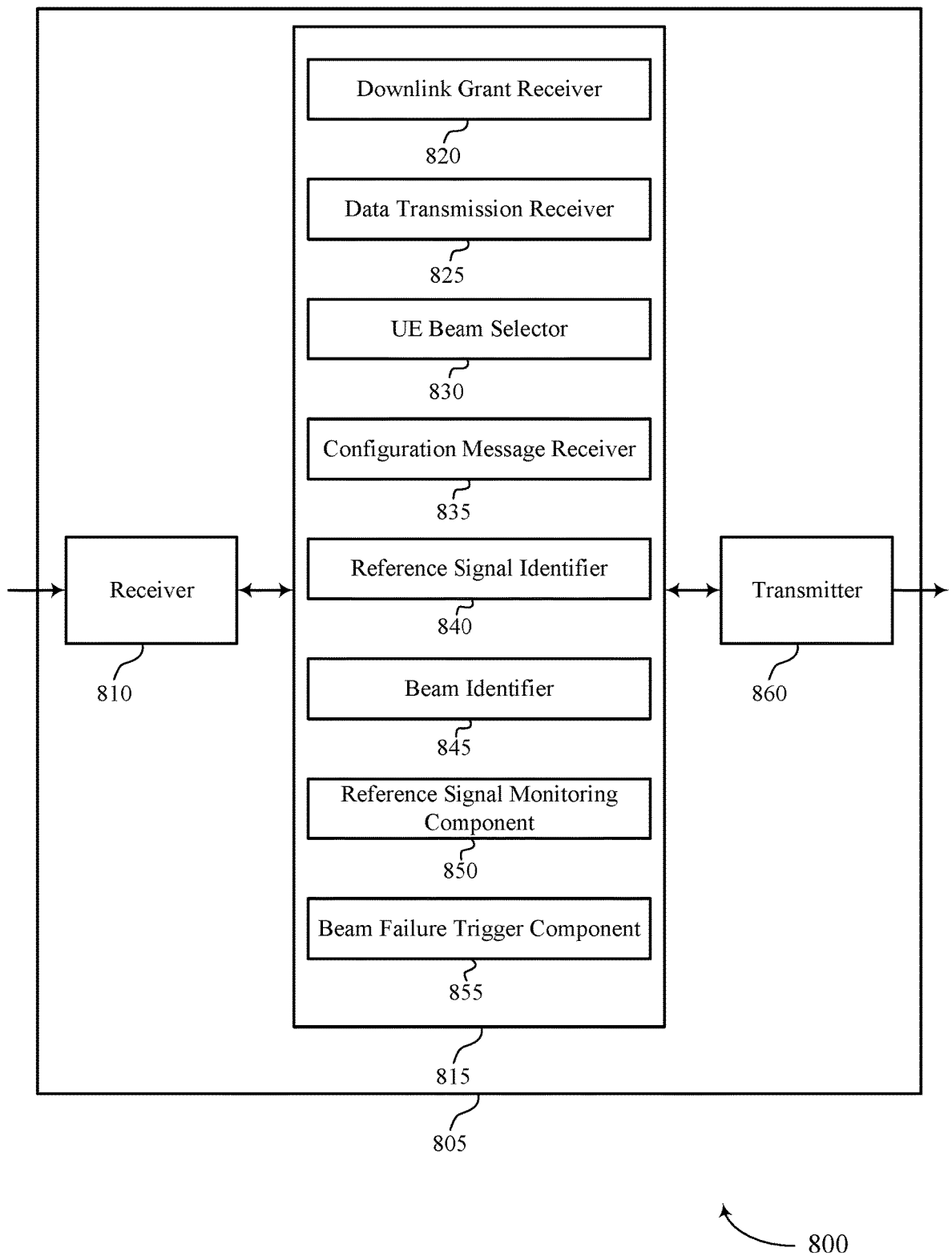

FIG. 8 shows a block diagram 800 of a device 805 that supports default beam identification and beam failure detection for cross carrier scheduling in accordance with aspects of the present disclosure. The device 805 may be an example of aspects of a device 705, or a UE 115 as described herein. The device 805 may include a receiver 810, a communications manager 815, and a transmitter 860. The device 805 may also include a processor. Each of these components may be in communication with one another (e.g., via one or more buses).

The receiver 810 may receive information such as packets, user data, or control information associated with various information channels (e.g., control channels, data channels, and information related to default beam identification and beam failure detection for cross carrier scheduling, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a downlink grant receiver 820, a data transmission receiver 825, an UE beam selector 830, a configuration message receiver 835, a reference signal identifier 840, a beam identifier 845, a reference signal monitoring component 850, and a beam failure trigger component 855. The communications manager 815 may be an example of aspects of the communications manager 1010 or the UE communications manager 150 described herein.

The downlink grant receiver 820 may receive, over a first component carrier, a first downlink grant for a first data transmission over a second component carrier and receive, over the first component carrier, a second downlink grant for a second data transmission over the second component carrier.

The data transmission receiver 825 may receive the first data transmission over the second component carrier using a first beam as a default beam and receive, based on the second downlink grant, the second data transmission over the second component carrier using the first beam as the default beam.

The UE beam selector 830 may select the first beam as the default beam for the second data transmission based on a receive time of the second data transmission occurring within a first threshold time window following the second downlink grant.

The configuration message receiver 835 may receive a configuration message indicating a set of TCI states for downlink data transmissions to the UE.

The reference signal identifier 840 may identify one or more reference signals to monitor for beam failure detection based on the indicated set of TCI states.

The beam identifier 845 may identify one or more beam failure detection beams based on the indicated set of TCI states and the identified one or more reference signals.

The reference signal monitoring component 850 may monitor the identified one or more reference signals using the identified one or more beam failure detection beams.

The beam failure trigger component 855 may selectively trigger a beam failure reporting procedure based on the monitoring.

The transmitter 860 may transmit signals generated by other components of the device 805. In some examples, the transmitter 860 may be collocated with a receiver 810 in a transceiver module. For example, the transmitter 860 may be an example of aspects of the transceiver 1020 described with reference to FIG. 10. The transmitter 860 may utilize a single antenna or a set of antennas.

Figure 9:
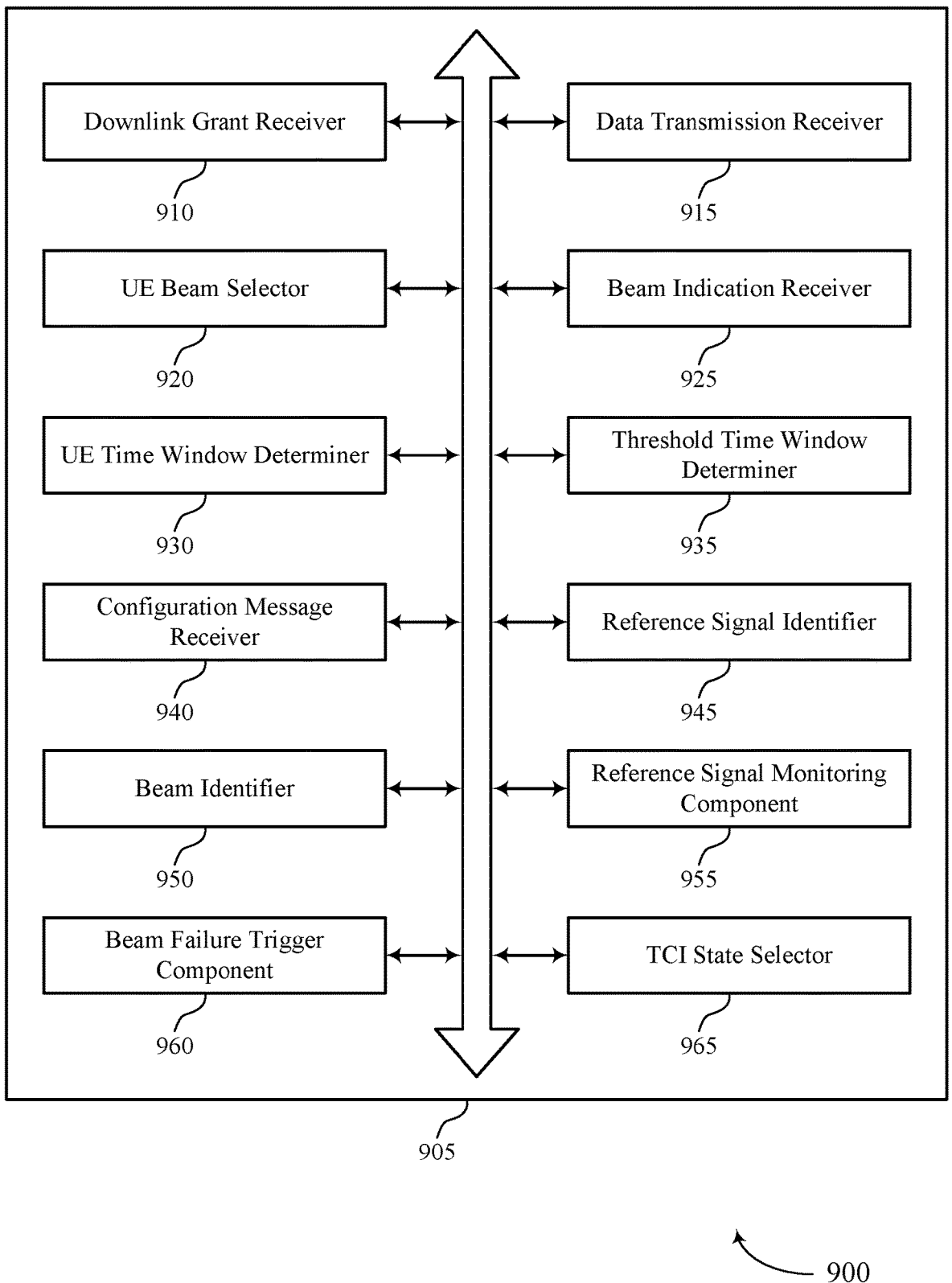
FIG. 9 shows a block diagram of a communications manager that supports default beam identification and beam failure detection for cross carrier scheduling in accordance with aspects of the present disclosure.

FIG. 9 shows a block diagram 900 of a communications manager 905 that supports default beam identification and beam failure detection for cross carrier scheduling in accordance with aspects of the present disclosure. The communications manager 905 may be an example of aspects of a communications manager 715, a communications manager 815, or a communications manager 1010 or the UE communications manager 150 described herein. The communications manager 905 may include a downlink grant receiver 910, a data transmission receiver 915, an UE beam selector 920, a beam indication receiver 925, an UE time window determiner 930, a threshold time window determiner 935, a configuration message receiver 940, a reference signal identifier 945, a beam identifier 950, a reference signal monitoring component 955, a beam failure trigger component 960, and a TCI state selector 965. Each of these modules may communicate, directly or indirectly, with one another (e.g., via one or more buses).

The downlink grant receiver 910 may receive, over a first component carrier, a first downlink grant for a first data transmission over a second component carrier. In some examples, the downlink grant receiver 910 may receive, over the first component carrier, a second downlink grant for a second data transmission over the second component carrier.

The data transmission receiver 915 may receive the first data transmission over the second component carrier using a first beam as a default beam. In some examples, the data transmission receiver 915 may receive, based on the second downlink grant, the second data transmission over the second component carrier using the first beam as the default beam.

The UE beam selector 920 may select the first beam as the default beam for the second data transmission based on a receive time of the second data transmission occurring within a first threshold time window following the second downlink grant.

The beam indication receiver 925 may receive an indication of the first beam as the default beam for the first data transmission. In some cases, the indication of the first beam is received in connection with the first downlink grant. In some cases, a receive time of the first data transmission occurs outside of the first threshold time window following the first downlink grant. In some cases, the indication of the first beam is received in connection with a RRC message.

The UE time window determiner 930 may determine that a receive time of the second downlink grant occurs after a second threshold time window following a receive time of the first data transmission, where selecting the first beam as the default beam is further based on the determination.

The threshold time window determiner 935 may transmit feedback information for the first data transmission, where the second threshold time window is defined based on a transmit time of the feedback information.

The configuration message receiver 940 may receive a configuration message indicating a set of TCI states for downlink data transmissions to the UE.

The reference signal identifier 945 may identify one or more reference signals to monitor for beam failure detection based on the indicated set of TCI states. In some examples, the reference signal identifier 945 may identify a reference signal type associated with each TCI state in the set of TCI states. In some examples, the reference signal identifier 945 may determine that a TCI state in the set of TCI states is associated with multiple reference signal types. In some examples, the reference signal identifier 945 may select, based on an entry associated with the TCI state, one of the reference signal types associated with the TCI state for use in selecting the subset of TCI states. In some examples, the reference signal identifier 945 may identify the one or more reference signals is further based on an amount of repetition for a given reference signal type during the downlink data transmissions. In some examples, the reference signal identifier 945 may identify the one or more reference signals is further based on a periodicity of a given reference signal type during the downlink data transmissions. In some examples, the reference signal identifier 945 may identify the one or more reference signals is further based on a receive power associated with a given reference signal type. In some cases, the entry associated with the TCI state is a Type D entry of the TCI state.

The beam identifier 950 may identify one or more beam failure detection beams based on the indicated set of TCI states and the identified one or more reference signals.

The reference signal monitoring component 955 may monitor the identified one or more reference signals using the identified one or more beam failure detection beams.

The beam failure trigger component 960 may selectively trigger a beam failure reporting procedure based on the monitoring.

The TCI state selector 965 may select, from the set of TCI states, a subset of TCI states for beam failure detection based on the reference signal type associated with each TCI state of the set of TCI states. In some examples, the TCI state selector 965 may determine an ascending or descending order of TCI states in the set of TCI states. In some examples, the TCI state selector 965 may identify a fixed number of TCI states for the subset of TCI states based on the ascending or descending order.

Figure 10:
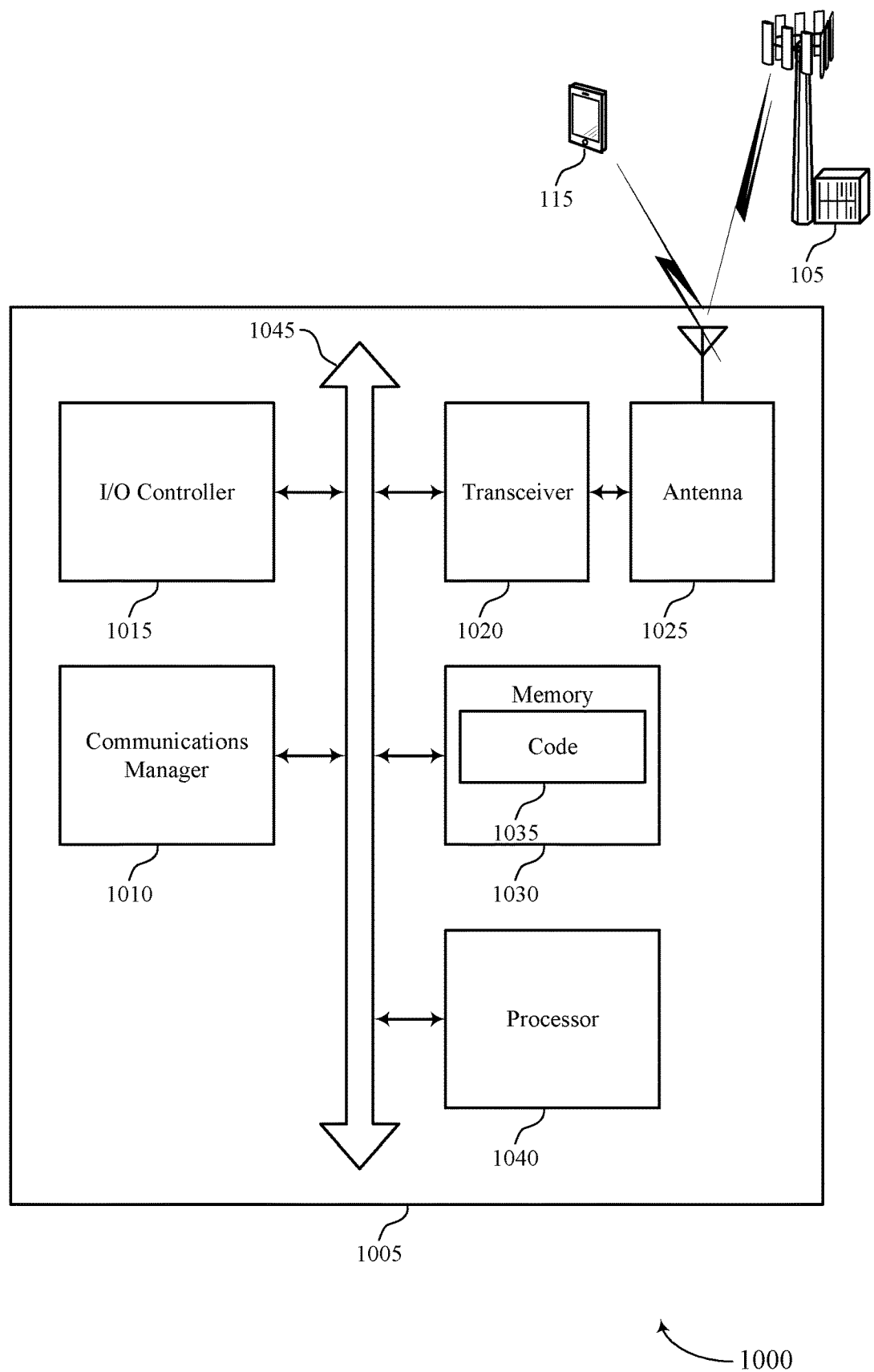
FIG. 10 shows a diagram of a system including a device that supports default beam identification and beam failure detection for cross carrier scheduling in accordance with aspects of the present disclosure.

FIG. 10 shows a diagram of a system 1000 including a device 1005 that supports default beam identification and beam failure detection for cross carrier scheduling in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, over a first component carrier, a first downlink grant for a first data transmission over a second component carrier, receive, over the first component carrier, a second downlink grant for a second data transmission over the second component carrier, receive the first data transmission over the second component carrier using a first beam as a default beam, receive, based on the second downlink grant, the second data transmission over the second component carrier using the first beam as the default beam, and select the first beam as the default beam for the second data transmission based on a receive time of the second data transmission occurring within a first threshold time window following the second downlink grant. The communications manager 1010 may also receive a configuration message indicating a set of TCI states for downlink data transmissions to the UE, identify one or more reference signals to monitor for beam failure detection based on the indicated set of TCI states, identify one or more beam failure detection beams based on the indicated set of TCI states and the identified one or more reference signals, monitor the identified one or more reference signals using the identified one or more beam failure detection beams, and selectively trigger a beam failure reporting procedure based on the monitoring.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting default beam identification and beam failure detection for cross carrier scheduling).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
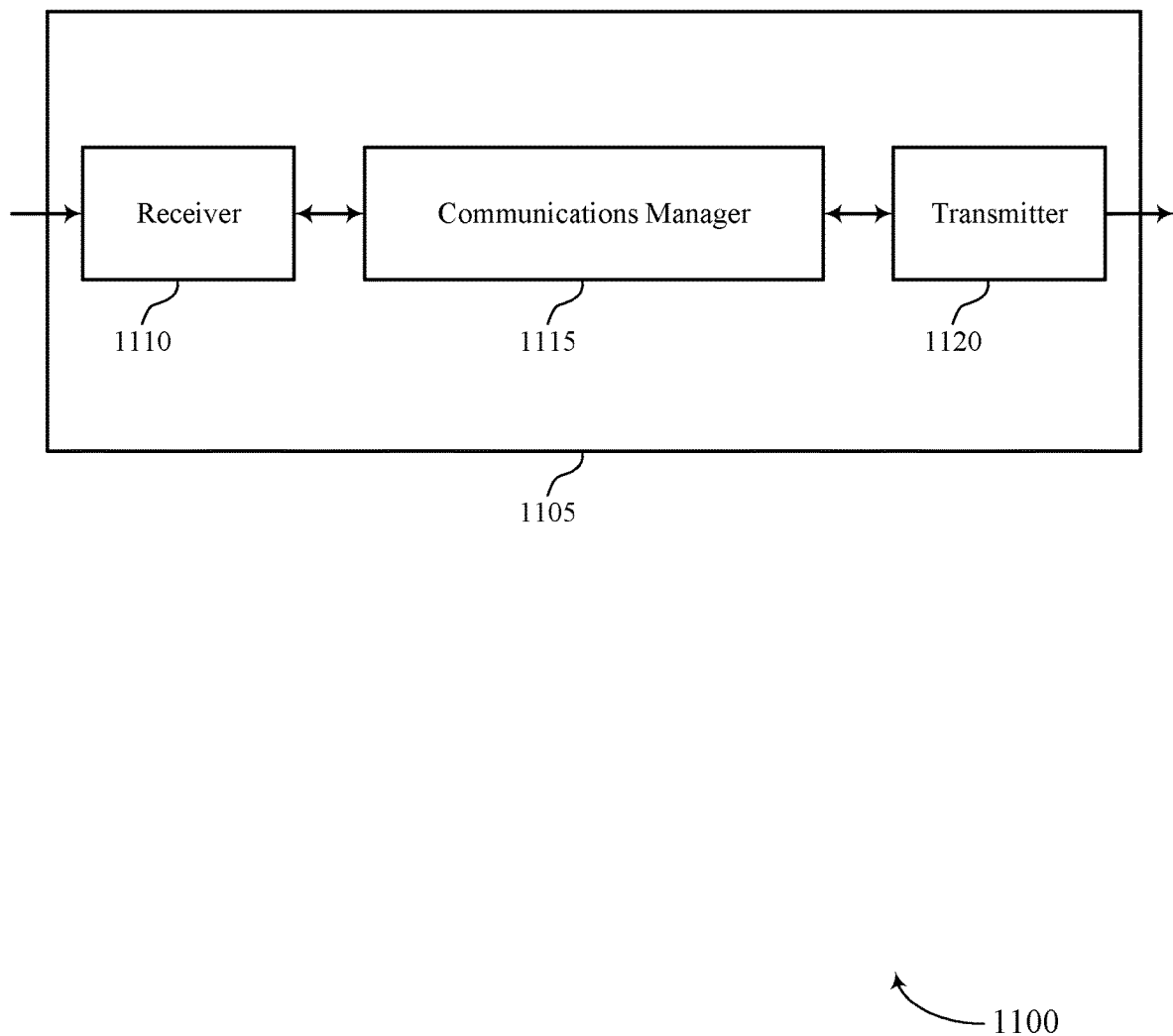
FIGS. 11 and 12 show block diagrams of devices that support default beam identification and beam failure detection for cross carrier scheduling in accordance with aspects of the present disclosure.

FIG. 11 shows a block diagram 1100 of a device 1105 that supports default beam identification and beam failure detection for cross carrier scheduling in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to default beam identification and beam failure detection for cross carrier scheduling, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, over a first component carrier, a first downlink grant for a first data transmission over a second component carrier, transmit, over the first component carrier, a second downlink grant for a second data transmission over the second component carrier, transmit the first data transmission over the second component carrier using a first beam as a default beam, transmit, based on the second downlink grant, the second data transmission over the second component carrier using the first beam as the default beam, and select the first beam as the default beam for the second data transmission based on a receive time of the second data transmission occurring within a first threshold time window following the second downlink grant. The communications manager 1115 may be an example of aspects of the communications manager 1410 or the base station communications manager 140 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
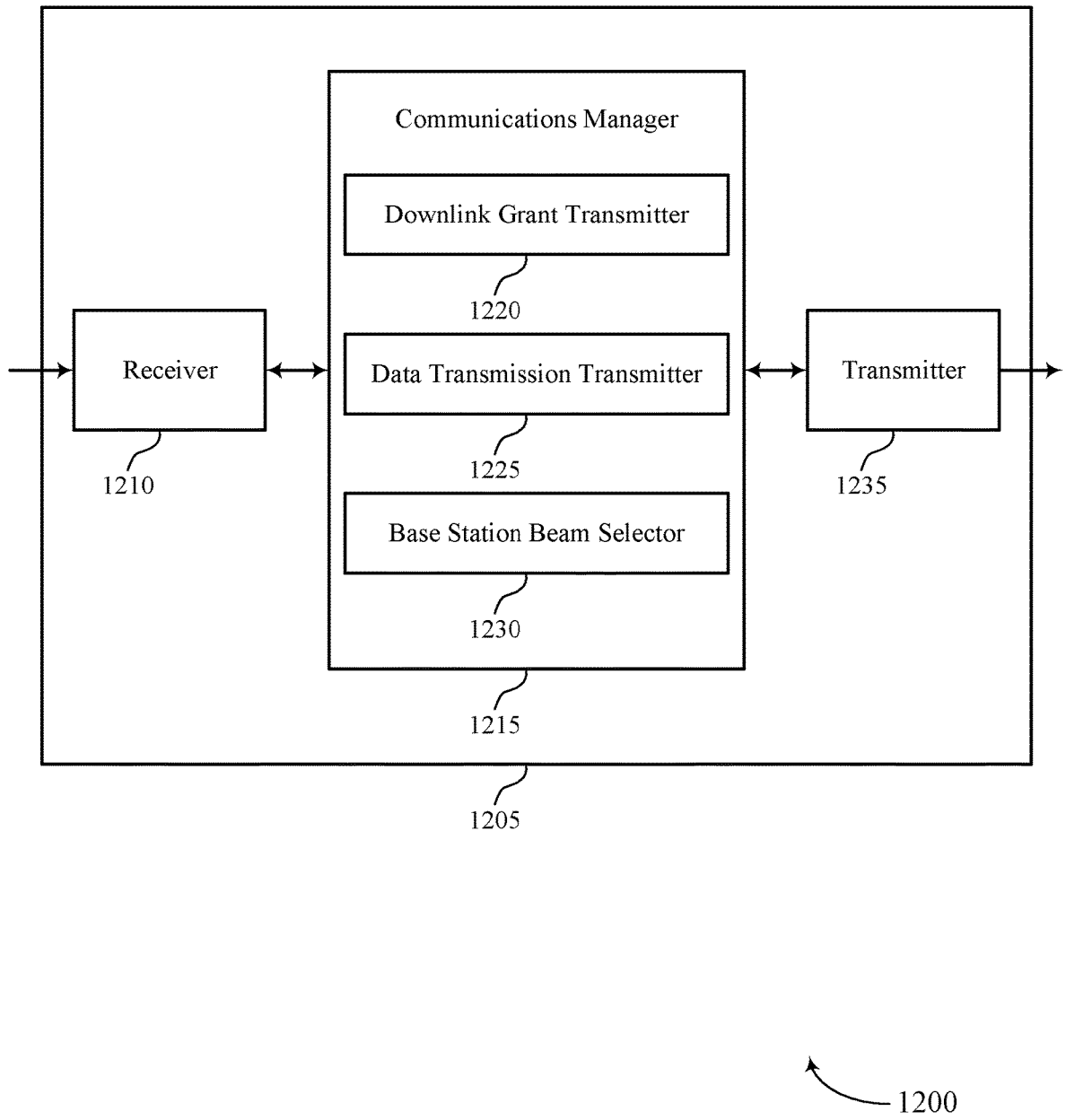

FIG. 12 shows a block diagram 1200 of a device 1205 that supports default beam identification and beam failure detection for cross carrier scheduling in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to default beam identification and beam failure detection for cross carrier scheduling, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a downlink grant transmitter 1220, a data transmission transmitter 1225, and a base station beam selector 1230. The communications manager 1215 may be an example of aspects of the communications manager 1410 or the base station communications manager 140 described herein.

The downlink grant transmitter 1220 may transmit, over a first component carrier, a first downlink grant for a first data transmission over a second component carrier and transmit, over the first component carrier, a second downlink grant for a second data transmission over the second component carrier.

The data transmission transmitter 1225 may transmit the first data transmission over the second component carrier using a first beam as a default beam and transmit, based on the second downlink grant, the second data transmission over the second component carrier using the first beam as the default beam.

The base station beam selector 1230 may select the first beam as the default beam for the second data transmission based on a receive time of the second data transmission occurring within a first threshold time window following the second downlink grant.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
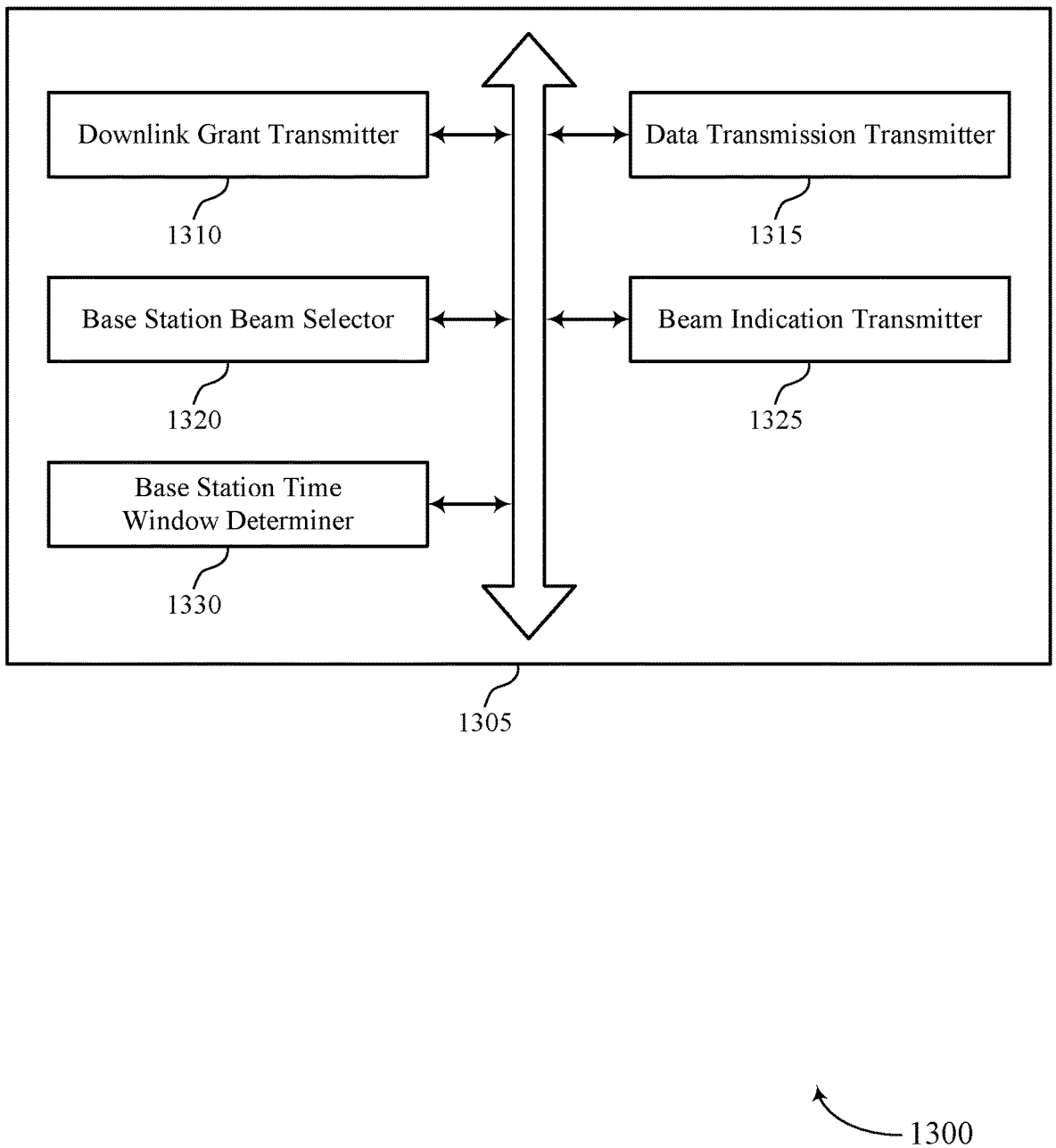
FIG. 13 shows a block diagram of a communications manager that supports default beam identification and beam failure detection for cross carrier scheduling in accordance with aspects of the present disclosure.

FIG. 13 shows a block diagram 1300 of a communications manager 1305 that supports default beam identification and beam failure detection for cross carrier scheduling in accordance with aspects of the present disclosure. The communications manager 1305 may be an example of aspects of a communications manager 1115, a communications manager 1215, or a communications manager 1410 or the base station communications manager 140 described herein. The communications manager 1305 may include a downlink grant transmitter 1310, a data transmission transmitter 1315, a base station beam selector 1320, a beam indication transmitter 1325, and a base station time window determiner 1330. Each of these modules may communicate, directly or indirectly, with one another (e.g., via one or more buses).

The downlink grant transmitter 1310 may transmit, over a first component carrier, a first downlink grant for a first data transmission over a second component carrier. In some examples, the downlink grant transmitter 1310 may transmit, over the first component carrier, a second downlink grant for a second data transmission over the second component carrier.

The data transmission transmitter 1315 may transmit the first data transmission over the second component carrier using a first beam as a default beam. In some examples, the data transmission transmitter 1315 may transmit, based on the second downlink grant, the second data transmission over the second component carrier using the first beam as the default beam.

The base station beam selector 1320 may select the first beam as the default beam for the second data transmission based on a receive time of the second data transmission occurring within a first threshold time window following the second downlink grant.

The beam indication transmitter 1325 may transmit an indication of the first beam as the default beam for the first data transmission. In some cases, the indication of the first beam is transmitted in connection with the first downlink grant. In some cases, a receive time of the first data transmission occurs outside of the first threshold time window following the first downlink grant. In some cases, the indication of the first beam is transmitted in connection with a RRC message.

The base station time window determiner 1330 may determine that a receive time of the second downlink grant occurs after a second threshold time window following a receive time of the first data transmission, where selecting the first beam as the default beam is further based on the determination. In some examples, the base station time window determiner 1330 may receive feedback information for the first data transmission, where the second threshold time window is defined based on a transmit time of the feedback information.

Figure 14:
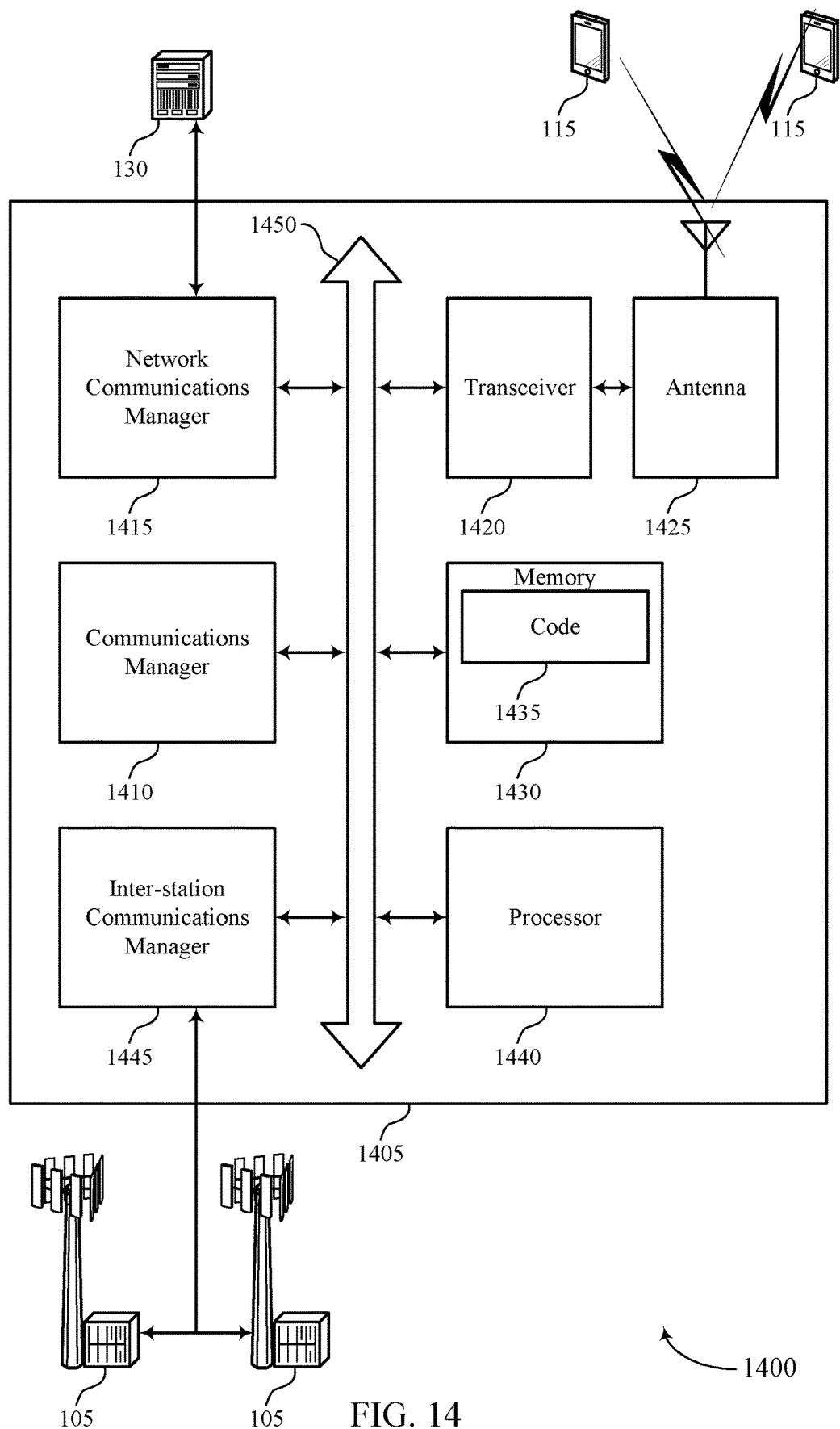
FIG. 14 shows a diagram of a system including a device that supports default beam identification and beam failure detection for cross carrier scheduling in accordance with aspects of the present disclosure.

FIG. 14 shows a diagram of a system 1400 including a device 1405 that supports default beam identification and beam failure detection for cross carrier scheduling in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, over a first component carrier, a first downlink grant for a first data transmission over a second component carrier, transmit, over the first component carrier, a second downlink grant for a second data transmission over the second component carrier, transmit the first data transmission over the second component carrier using a first beam as a default beam, transmit, based on the second downlink grant, the second data transmission over the second component carrier using the first beam as the default beam, and select the first beam as the default beam for the second data transmission based on a receive time of the second data transmission occurring within a first threshold time window following the second downlink grant.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting default beam identification and beam failure detection for cross carrier scheduling).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
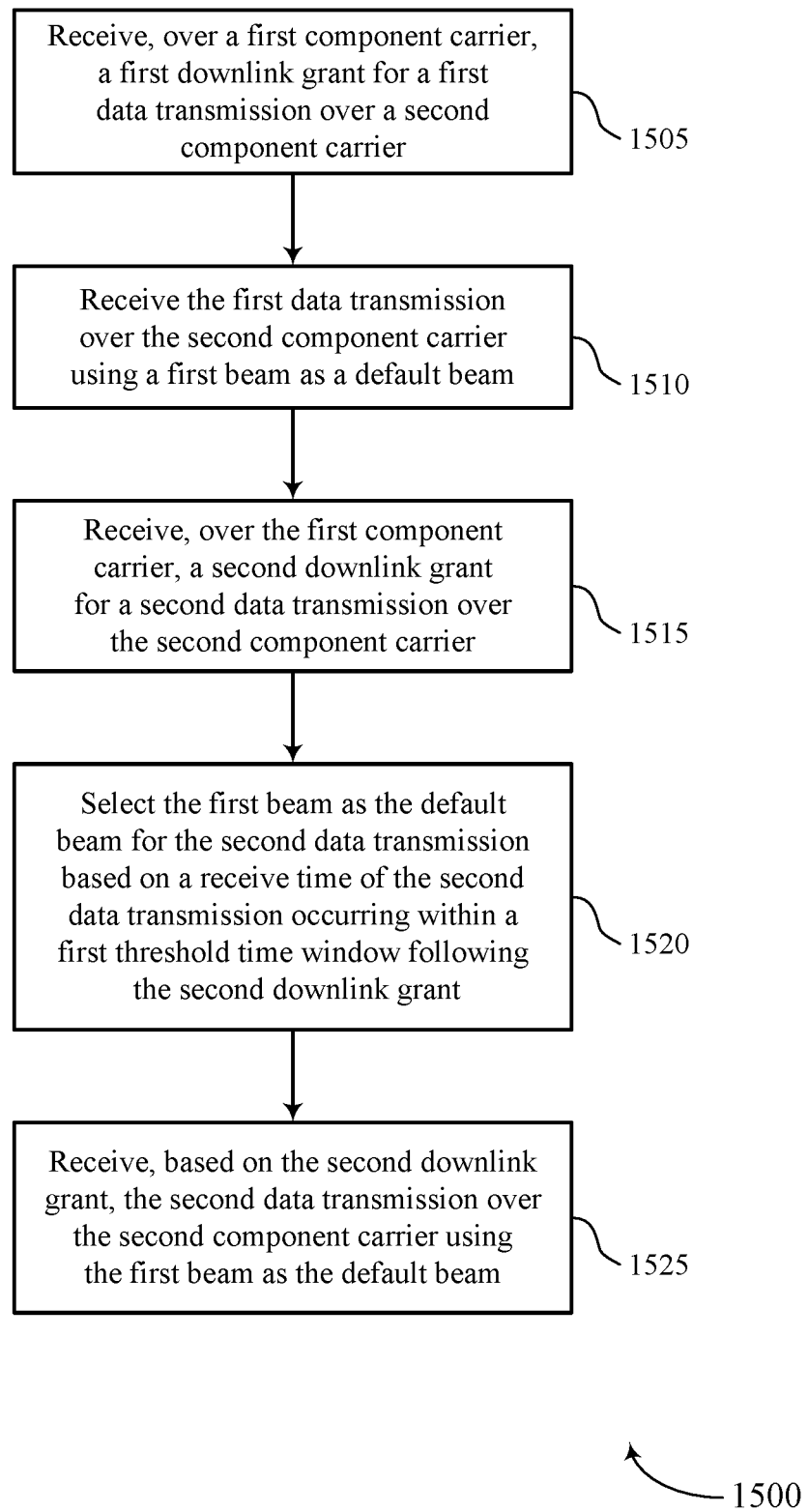
FIGS. 15 through 20 show flowcharts illustrating methods that support default beam identification and beam failure detection for cross carrier scheduling in accordance with aspects of the present disclosure.

FIG. 15 shows a flowchart illustrating a method 1500 that supports default beam identification and beam failure detection for cross carrier scheduling in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, over a first component carrier, a first downlink grant for a first data transmission over a second component carrier. The operations of 1505 may be performed according to the methods described herein. In some examples, aspects of the operations of 1505 may be performed by a downlink grant receiver as described with reference to FIGS. 7 through 10.

At 1510, the UE may receive the first data transmission over the second component carrier using a first beam as a default beam. The operations of 1510 may be performed according to the methods described herein. In some examples, aspects of the operations of 1510 may be performed by a data transmission receiver as described with reference to FIGS. 7 through 10.

At 1515, the UE may receive, over the first component carrier, a second downlink grant for a second data transmission over the second component carrier. The operations of 1515 may be performed according to the methods described herein. In some examples, aspects of the operations of 1515 may be performed by a downlink grant receiver as described with reference to FIGS. 7 through 10.

At 1520, the UE may select the first beam as the default beam for the second data transmission based on a receive time of the second data transmission occurring within a first threshold time window following the second downlink grant. The operations of 1520 may be performed according to the methods described herein. In some examples, aspects of the operations of 1520 may be performed by an UE beam selector as described with reference to FIGS. 7 through 10.

At 1525, the UE may receive, based on the second downlink grant, the second data transmission over the second component carrier using the first beam as the default beam. The operations of 1525 may be performed according to the methods described herein. In some examples, aspects of the operations of 1525 may be performed by a data transmission receiver as described with reference to FIGS. 7 through 10.

Figure 16:
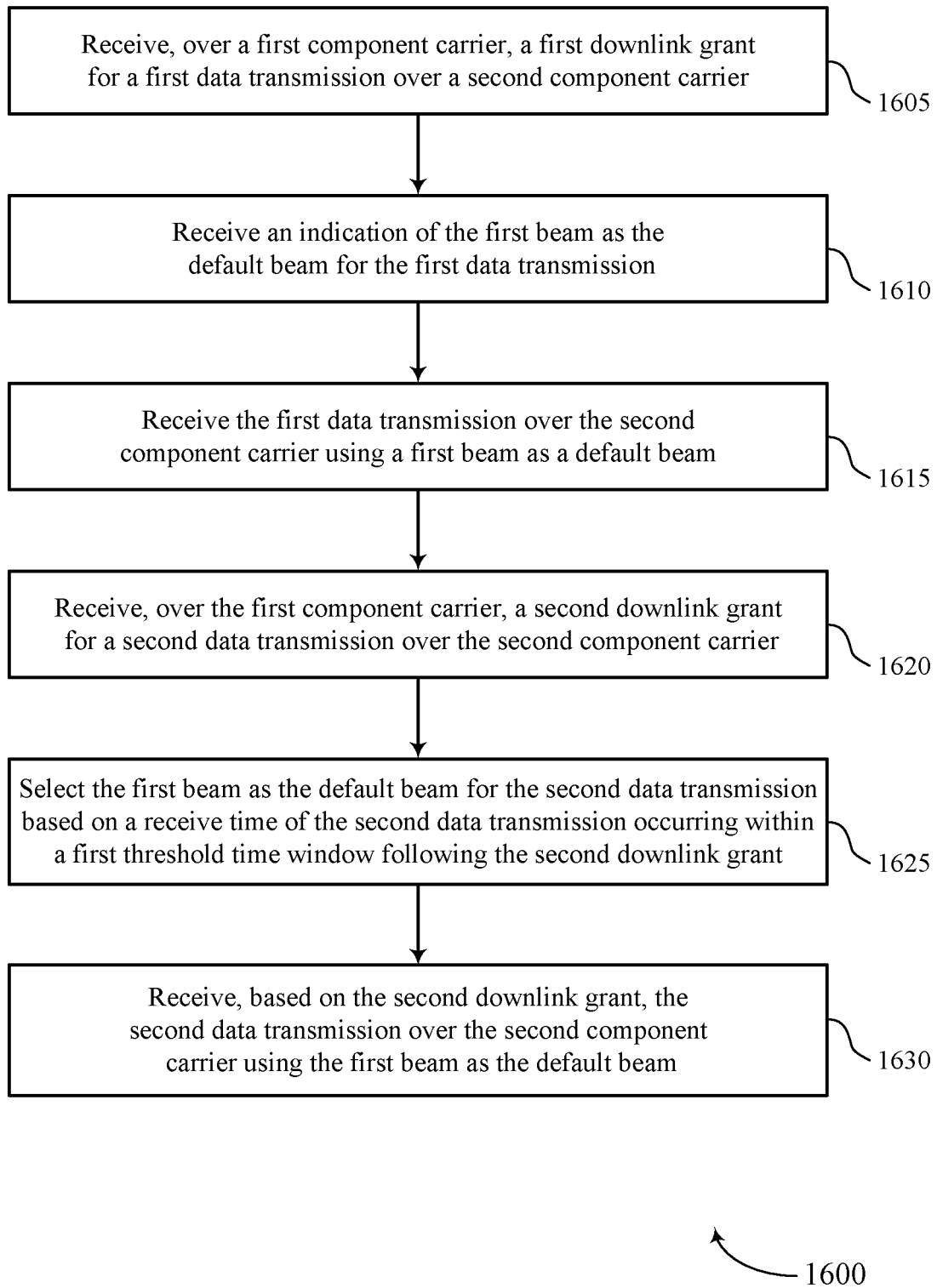

FIG. 16 shows a flowchart illustrating a method 1600 that supports default beam identification and beam failure detection for cross carrier scheduling in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, over a first component carrier, a first downlink grant for a first data transmission over a second component carrier. The operations of 1605 may be performed according to the methods described herein. In some examples, aspects of the operations of 1605 may be performed by a downlink grant receiver as described with reference to FIGS. 7 through 10.

At 1610, the UE may receive an indication of the first beam as the default beam for the first data transmission. The operations of 1610 may be performed according to the methods described herein. In some examples, aspects of the operations of 1610 may be performed by a beam indication receiver as described with reference to FIGS. 7 through 10.

At 1615, the UE may receive the first data transmission over the second component carrier using a first beam as a default beam. The operations of 1615 may be performed according to the methods described herein. In some examples, aspects of the operations of 1615 may be performed by a data transmission receiver as described with reference to FIGS. 7 through 10.

At 1620, the UE may receive, over the first component carrier, a second downlink grant for a second data transmission over the second component carrier. The operations of 1620 may be performed according to the methods described herein. In some examples, aspects of the operations of 1620 may be performed by a downlink grant receiver as described with reference to FIGS. 7 through 10.

At 1625, the UE may select the first beam as the default beam for the second data transmission based on a receive time of the second data transmission occurring within a first threshold time window following the second downlink grant. The operations of 1625 may be performed according to the methods described herein. In some examples, aspects of the operations of 1625 may be performed by an UE beam selector as described with reference to FIGS. 7 through 10.

At 1630, the UE may receive, based on the second downlink grant, the second data transmission over the second component carrier using the first beam as the default beam. The operations of 1630 may be performed according to the methods described herein. In some examples, aspects of the operations of 1630 may be performed by a data transmission receiver as described with reference to FIGS. 7 through 10.

Figure 17:
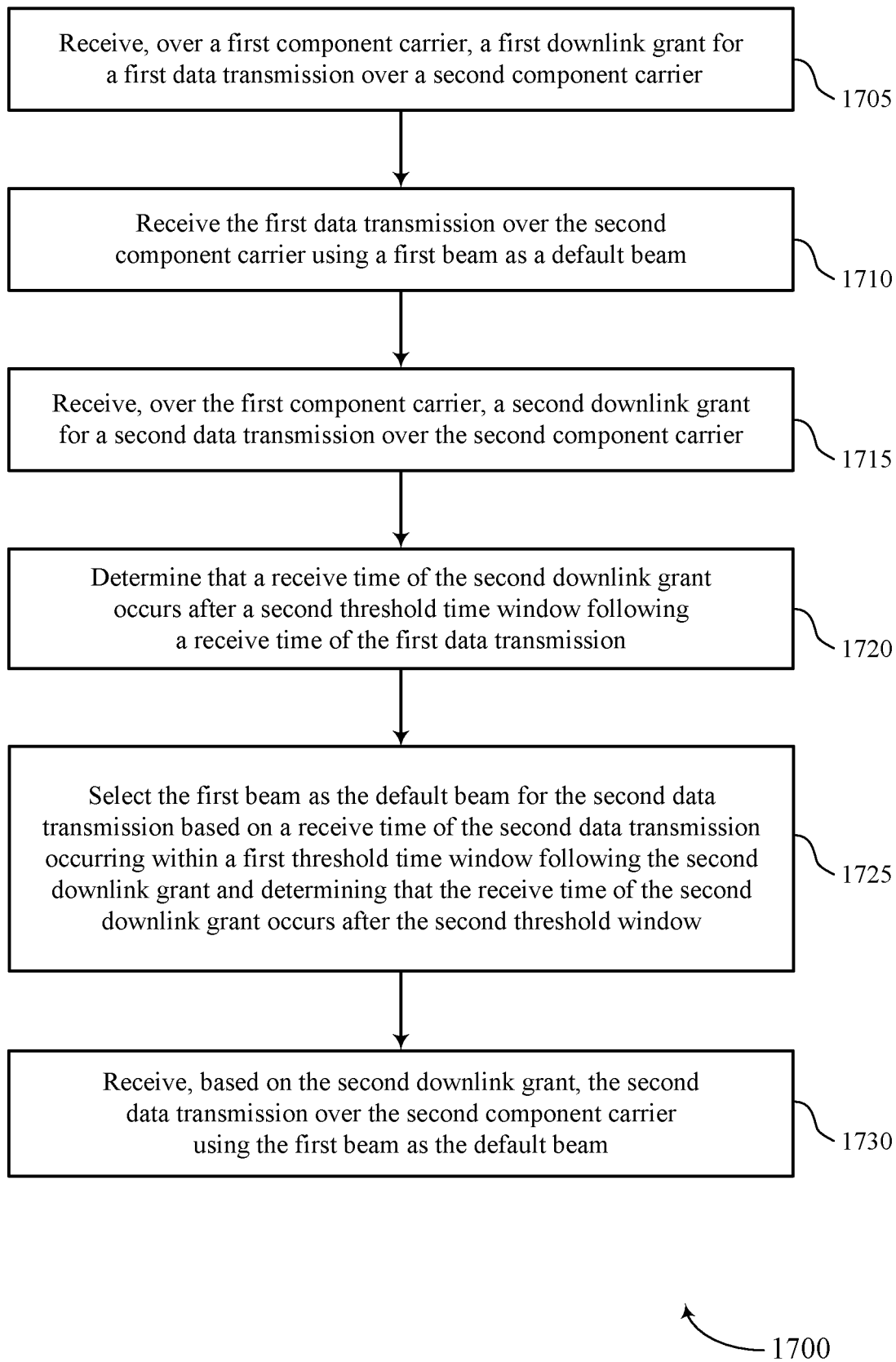

FIG. 17 shows a flowchart illustrating a method 1700 that supports default beam identification and beam failure detection for cross carrier scheduling in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive, over a first component carrier, a first downlink grant for a first data transmission over a second component carrier. The operations of 1705 may be performed according to the methods described herein. In some examples, aspects of the operations of 1705 may be performed by a downlink grant receiver as described with reference to FIGS. 7 through 10.

At 1710, the UE may receive the first data transmission over the second component carrier using a first beam as a default beam. The operations of 1710 may be performed according to the methods described herein. In some examples, aspects of the operations of 1710 may be performed by a data transmission receiver as described with reference to FIGS. 7 through 10.

At 1715, the UE may receive, over the first component carrier, a second downlink grant for a second data transmission over the second component carrier. The operations of 1715 may be performed according to the methods described herein. In some examples, aspects of the operations of 1715 may be performed by a downlink grant receiver as described with reference to FIGS. 7 through 10.

At 1720, the UE may determine that a receive time of the second downlink grant occurs after a second threshold time window following a receive time of the first data transmission. The operations of 1720 may be performed according to the methods described herein. In some examples, aspects of the operations of 1720 may be performed by an UE beam selector as described with reference to FIGS. 7 through 10.

At 1725, the UE may select the first beam as the default beam for the second data transmission based on a receive time of the second data transmission occurring within a first threshold time window following the second downlink grant and determining that the receive time of the second downlink grant occurs after the second threshold window. The operations of 1725 may be performed according to the methods described herein. In some examples, aspects of the operations of 1725 may be performed by an UE time window determiner as described with reference to FIGS. 7 through 10.

At 1730, the UE may receive, based on the second downlink grant, the second data transmission over the second component carrier using the first beam as the default beam. The operations of 1730 may be performed according to the methods described herein. In some examples, aspects of the operations of 1730 may be performed by a data transmission receiver as described with reference to FIGS. 7 through 10.

Figure 18:
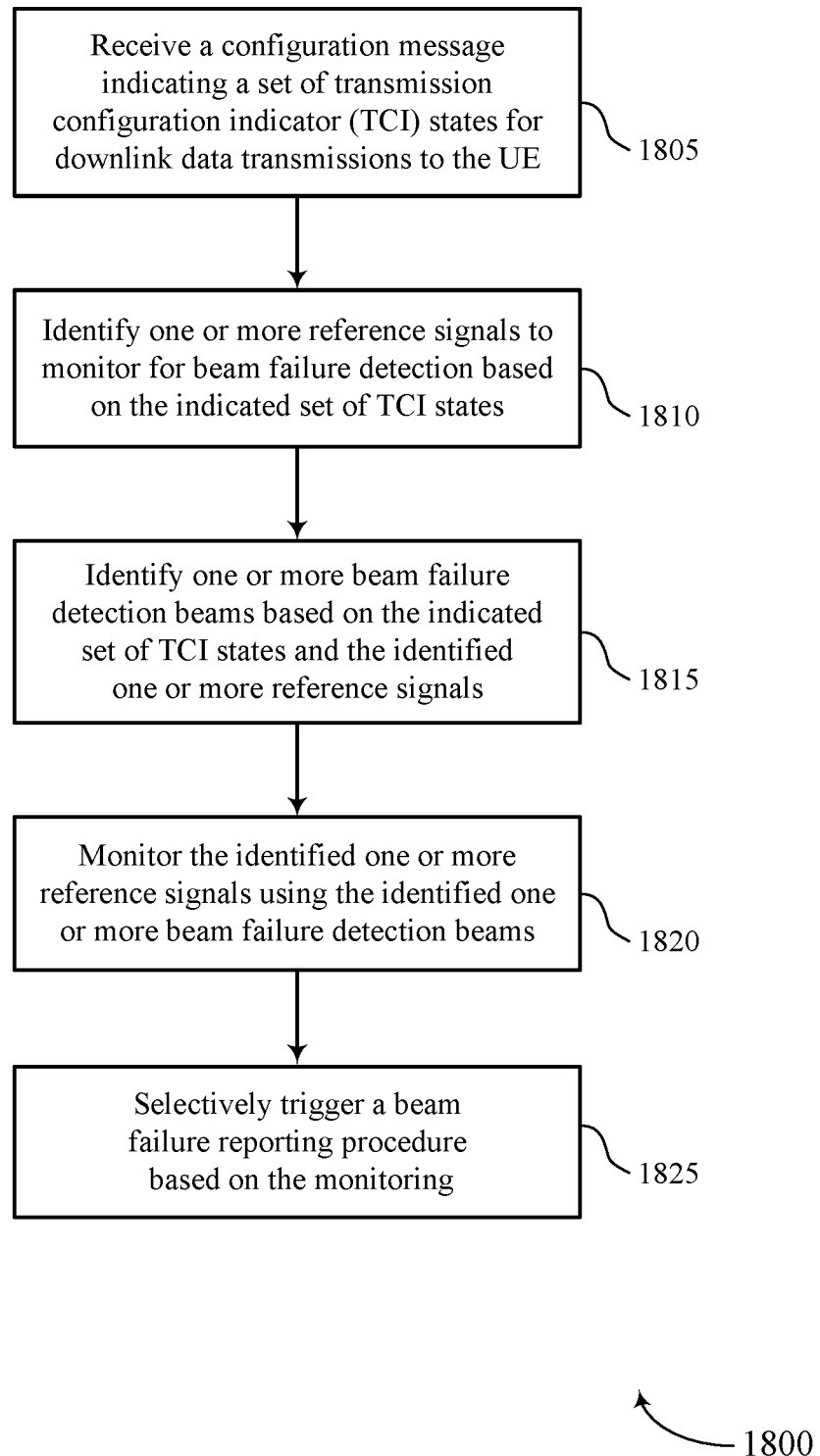

FIG. 18 shows a flowchart illustrating a method 1800 that supports default beam identification and beam failure detection for cross carrier scheduling in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive a configuration message indicating a set of TCI states for downlink data transmissions to the UE. The operations of 1805 may be performed according to the methods described herein. In some examples, aspects of the operations of 1805 may be performed by a configuration message receiver as described with reference to FIGS. 7 through 10.

At 1810, the UE may identify one or more reference signals to monitor for beam failure detection based on the indicated set of TCI states. The operations of 1810 may be performed according to the methods described herein. In some examples, aspects of the operations of 1810 may be performed by a reference signal identifier as described with reference to FIGS. 7 through 10.

At 1815, the UE may identify one or more beam failure detection beams based on the indicated set of TCI states and the identified one or more reference signals. The operations of 1815 may be performed according to the methods described herein. In some examples, aspects of the operations of 1815 may be performed by a beam identifier as described with reference to FIGS. 7 through 10.

At 1820, the UE may monitor the identified one or more reference signals using the identified one or more beam failure detection beams. The operations of 1820 may be performed according to the methods described herein. In some examples, aspects of the operations of 1820 may be performed by a reference signal monitoring component as described with reference to FIGS. 7 through 10.

At 1825, the UE may selectively trigger a beam failure reporting procedure based on the monitoring. The operations of 1825 may be performed according to the methods described herein. In some examples, aspects of the operations of 1825 may be performed by a beam failure trigger component as described with reference to FIGS. 7 through 10.

Figure 19:
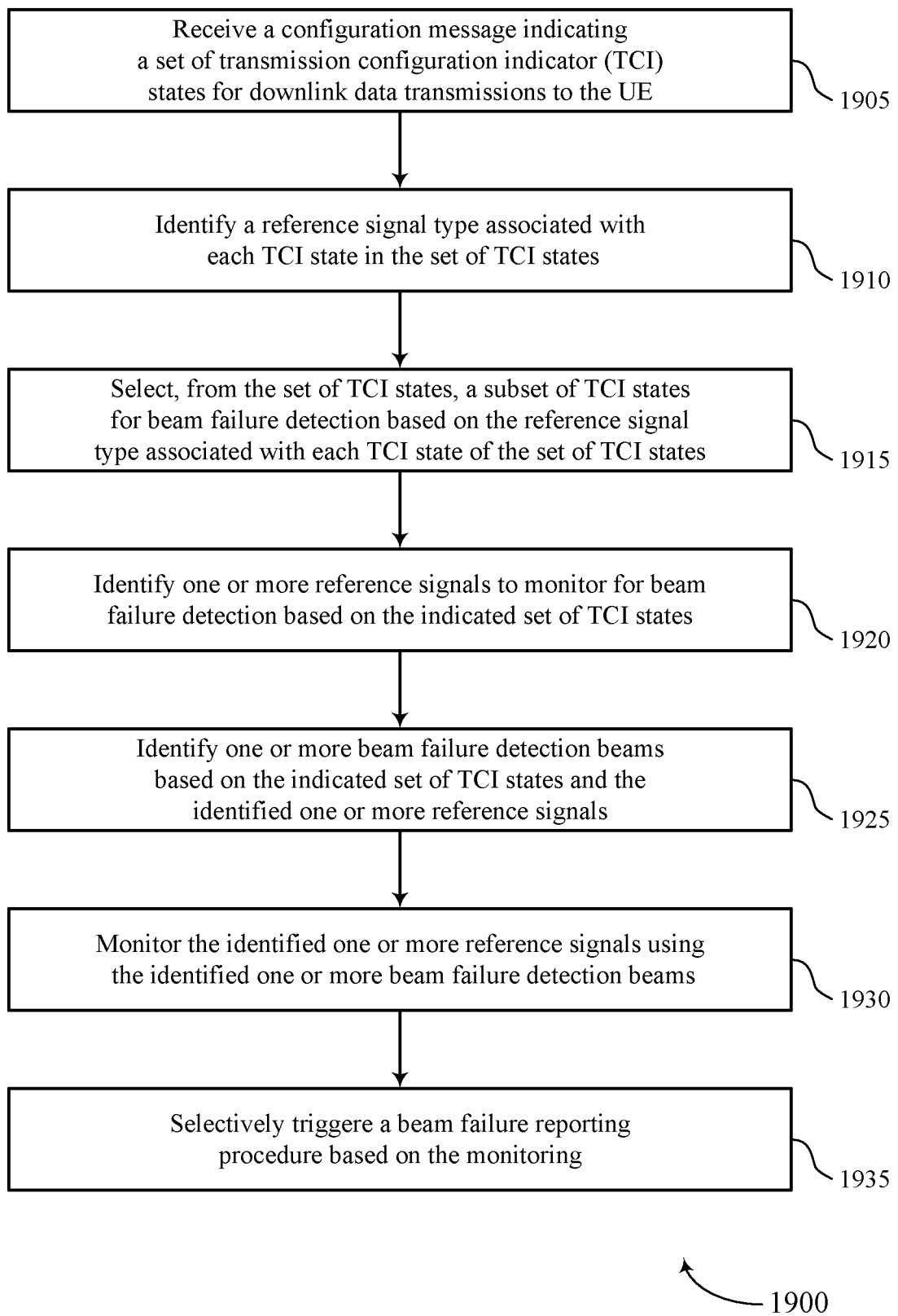

FIG. 19 shows a flowchart illustrating a method 1900 that supports default beam identification and beam failure detection for cross carrier scheduling in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may receive a configuration message indicating a set of TCI states for downlink data transmissions to the UE. The operations of 1905 may be performed according to the methods described herein. In some examples, aspects of the operations of 1905 may be performed by a configuration message receiver as described with reference to FIGS. 7 through 10.

At 1910, the UE may identify a reference signal type associated with each TCI state in the set of TCI states. The operations of 1910 may be performed according to the methods described herein. In some examples, aspects of the operations of 1910 may be performed by a reference signal identifier as described with reference to FIGS. 7 through 10.

At 1915, the UE may select, from the set of TCI states, a subset of TCI states for beam failure detection based on the reference signal type associated with each TCI state of the set of TCI states. The operations of 1915 may be performed according to the methods described herein. In some examples, aspects of the operations of 1915 may be performed by a TCI state selector as described with reference to FIGS. 7 through 10.

At 1920, the UE may identify one or more reference signals to monitor for beam failure detection based on the indicated set of TCI states. The operations of 1920 may be performed according to the methods described herein. In some examples, aspects of the operations of 1920 may be performed by a reference signal identifier as described with reference to FIGS. 7 through 10.

At 1925, the UE may identify one or more beam failure detection beams based on the indicated set of TCI states and the identified one or more reference signals. The operations of 1925 may be performed according to the methods described herein. In some examples, aspects of the operations of 1925 may be performed by a beam identifier as described with reference to FIGS. 7 through 10.

At 1930, the UE may monitor the identified one or more reference signals using the identified one or more beam failure detection beams. The operations of 1930 may be performed according to the methods described herein. In some examples, aspects of the operations of 1930 may be performed by a reference signal monitoring component as described with reference to FIGS. 7 through 10.

At 1935, the UE may selectively trigger a beam failure reporting procedure based on the monitoring. The operations of 1935 may be performed according to the methods described herein. In some examples, aspects of the operations of 1935 may be performed by a beam failure trigger component as described with reference to FIGS. 7 through 10.

Figure 20:
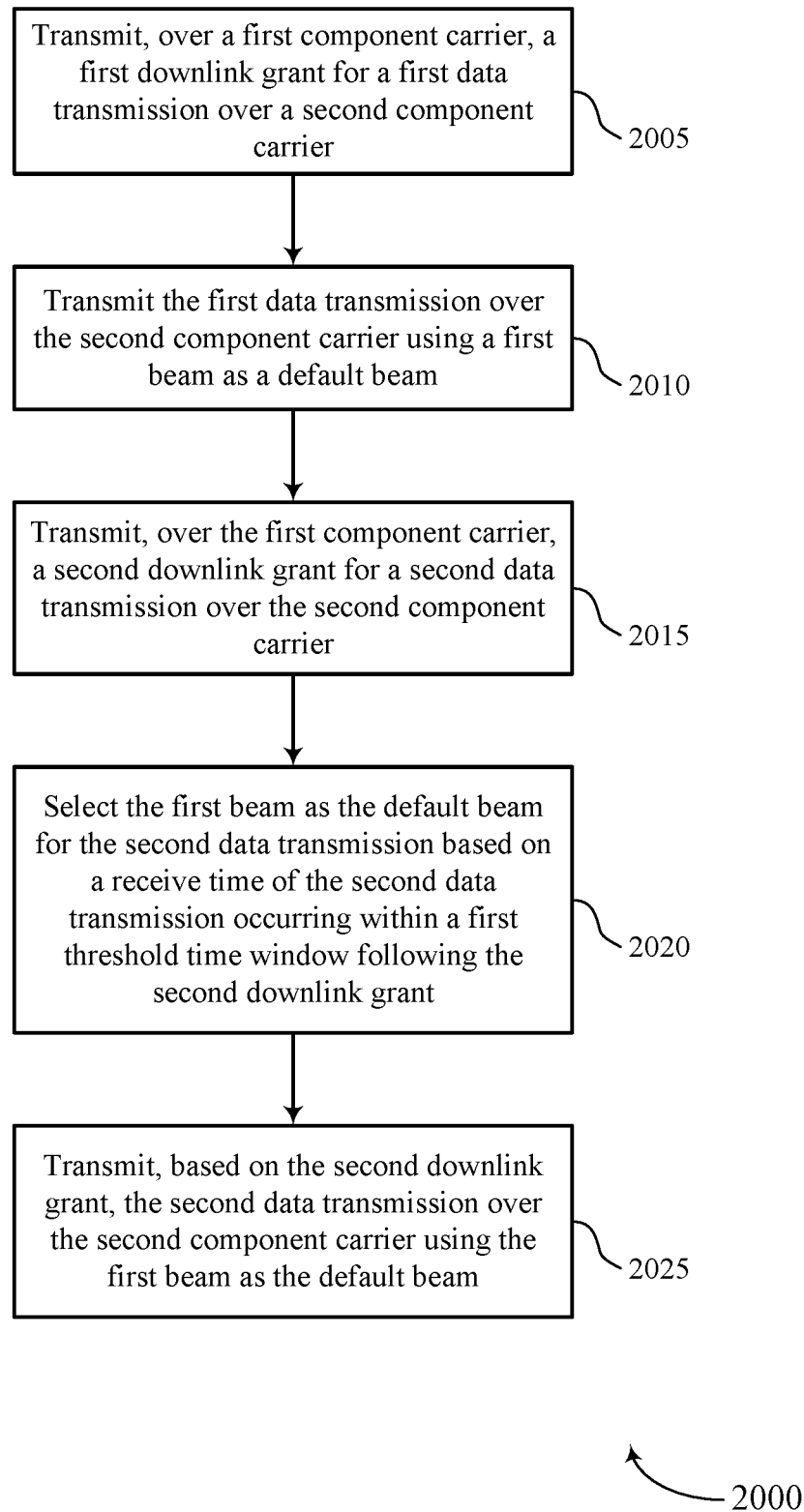

FIG. 20 shows a flowchart illustrating a method 2000 that supports default beam identification and beam failure detection for cross carrier scheduling in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit, over a first component carrier, a first downlink grant for a first data transmission over a second component carrier. The operations of 2005 may be performed according to the methods described herein. In some examples, aspects of the operations of 2005 may be performed by a downlink grant transmitter as described with reference to FIGS. 11 through 14.

At 2010, the base station may transmit the first data transmission over the second component carrier using a first beam as a default beam. The operations of 2010 may be performed according to the methods described herein. In some examples, aspects of the operations of 2010 may be performed by a data transmission transmitter as described with reference to FIGS. 11 through 14.

At 2015, the base station may transmit, over the first component carrier, a second downlink grant for a second data transmission over the second component carrier. The operations of 2015 may be performed according to the methods described herein. In some examples, aspects of the operations of 2015 may be performed by a downlink grant transmitter as described with reference to FIGS. 11 through 14.

At 2020, the base station may select the first beam as the default beam for the second data transmission based on a receive time of the second data transmission occurring within a first threshold time window following the second downlink grant. The operations of 2020 may be performed according to the methods described herein. In some examples, aspects of the operations of 2020 may be performed by a base station beam selector as described with reference to FIGS. 11 through 14.

At 2025, the base station may transmit, based on the second downlink grant, the second data transmission over the second component carrier using the first beam as the default beam. The operations of 2025 may be performed according to the methods described herein. In some examples, aspects of the operations of 2025 may be performed by a data transmission transmitter as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   a processor,
   memory coupled to the processor; and
   instructions stored in the memory and executable by the processor to cause the apparatus to:
   receive a configuration message indicating a set of transmission configuration indicator (TCI) states for downlink data transmissions to the UE;

identify one or more reference signals to monitor for beam failure detection based at least in part on the indicated set of TCI states;

determine a reference signal type associated with each TCI state in the set of TCI states;

select, from the set of TCI states, a subset of TCI states for beam failure detection based at least in part on the reference signal type associated with each TCI state in the set of TCI states;

identify one or more beam failure detection beams based at least in part on the subset of TCI states and the identified one or more reference signals;

monitor the identified one or more reference signals using the identified one or more beam failure detection beams; and selectively trigger a beam failure reporting procedure based at least in part on the monitoring.

2. The apparatus of claim 1, wherein instructions executable by the processor to cause the apparatus to determine the reference signal type associated with each TCI state in the set of TCI states further comprises instructions executable by the processor to cause the apparatus to:

determine that a TCI state in the set of TCI states is associated with multiple reference signal types; and select, based at least in part on an entry associated with the TCI state, one of the reference signal types associated with the TCI state for use in selecting the subset of TCI states.

3. The apparatus of claim 2, wherein the entry associated with the TCI state is a Type D entry of the TCI state.

4. The apparatus of claim 1, wherein the instructions executable by the processor to cause the apparatus to select the subset of TCI states for beam failure detection further comprises instructions executable by the processor to cause the apparatus to:

determine an ascending or descending order of TCI states in the set of TCI states; and identify a fixed quantity of TCI states for the subset of TCI states based on the ascending or descending order.

5. The apparatus of claim 1, wherein the instructions executable by the processor to cause the apparatus to identify the one or more reference signals is further based at least in part on an amount of repetition for a given reference signal type during the downlink data transmissions.

6. The apparatus of claim 1, wherein the instructions executable by the processor to cause the apparatus to identify the one or more reference signals is further based at least in part on a periodicity of a given reference signal type during the downlink data transmissions.

7. The apparatus of claim 1, wherein the instructions executable by the processor to cause the apparatus to identify the one or more reference signals is further based at least in part on a receive power associated with a given reference signal type.

8. The apparatus of claim 1, wherein the instructions executable by the processor to cause the apparatus to selectively trigger the beam failure reporting procedure further comprises instructions executable by the processor to cause the apparatus to:

trigger the beam failure reporting procedure when all beams of the beam failure detection set have a block error rate (BLER) greater than an out-of-sync (00S) BLER.

9. A method for wireless communication at a user equipment (UE), comprising:

receiving a configuration message indicating a set of transmission configuration indicator (TCI) states for downlink data transmissions to the UE;

identifying one or more reference signals to monitor for beam failure detection based at least in part on the indicated set of TCI states;

determining a reference signal type associated with each TCI state in the set of TCI states;

selecting, from the set of TCI states, a subset of TCI states for beam failure detection based at least in part on the reference signal type associated with each TCI state in the set of TCI states;

identifying one or more beam failure detection beams based at least in part on the subset of TCI states and the identified one or more reference signals;

monitoring the identified one or more reference signals using the identified one or more beam failure detection beams; and selectively triggering a beam failure reporting procedure based at least in part on the monitoring.

10. The method of claim 9, wherein determining the reference signal type associated with each TCI state in the set of TCI states comprises:

determining that a TCI state in the set of TCI states is associated with multiple reference signal types; and selecting, based at least in part on an entry associated with the TCI state, one of the reference signal types associated with the TCI state for use in selecting the subset of TCI states.

11. The method of claim 10, wherein the entry associated with the TCI state is a Type D entry of the TCI state.

12. The method of claim 9, wherein selecting the subset of TCI states for beam failure detection comprises:

determining an ascending or descending order of TCI states in the set of TCI states; and identifying a fixed quantity of TCI states for the subset of TCI states based on the ascending or descending order.

13. The method of claim 9, wherein identifying the one or more reference signals is further based at least in part on an amount of repetition for a given reference signal type during the downlink data transmissions.

14. The method of claim 9, wherein identifying the one or more reference signals is further based at least in part on a periodicity of a given reference signal type during the downlink data transmissions.

15. The method of claim 9, wherein identifying the one or more reference signals is further based at least in part on a receive power associated with a given reference signal type.

16. The method of claim 9, wherein selectively triggering the beam failure reporting procedure further comprises:

triggering the beam failure reporting procedure when all beams of the beam failure detection set have a block error rate (BLER) greater than an out-of-sync (00S) BLER.

17. An apparatus for wireless communication at a user equipment (UE), comprising:

means for receiving a configuration message indicating a set of transmission configuration indicator (TCI) states for downlink data transmissions to the UE;

means for identifying one or more reference signals to monitor for beam failure detection based at least in part on the indicated set of TCI states;

means for determining a reference signal type associated with each TCI state in the set of TCI states;

means for selecting, from the set of TCI states, a subset of TCI states for beam failure detection based at least in part on the reference signal type associated with each TCI state in the set of TCI states;
means for identifying one or more beam failure detection beams based at least in part on the indicated set of TCI states and the identified one or more reference signals;
means for monitoring the identified one or more reference signals using the identified one or more beam failure detection beams; and
means for selectively triggering a beam failure reporting procedure based at least in part on the monitoring.

18. The apparatus of claim 17, wherein determining the reference signal type associated with each TCI state in the set of TCI states comprises:
means for determining that a TCI state in the set of TCI states is associated with multiple reference signal types; and
means for selecting, based at least in part on an entry associated with the TCI state, one of the reference signal types associated with the TCI state for use in selecting the subset of TCI states.

19. The apparatus of claim 18, wherein the entry associated with the TCI state is a Type D entry of the TCI state.

20. The apparatus of claim 17, wherein the means for selecting the subset of TCI states for beam failure detection comprises:
means for determining an ascending or descending order of TCI states in the set of TCI states; and
means for identifying a fixed quantity of TCI states for the subset of TCI states based on the ascending or descending order.

21. The apparatus of claim 17, wherein the means for selectively triggering the beam failure reporting procedure further comprises:
means for triggering the beam failure reporting procedure when all beams of the beam failure detection set have a block error rate (BLER) greater than an out-of-sync (OOS) BLER.

22. The apparatus of claim 17, wherein the means for identifying the one or more reference signals is further based at least in part on an amount of repetition for a given reference signal type during the downlink data transmissions.

23. The apparatus of claim 17, wherein the means for identifying the one or more reference signals is further based at least in part on a periodicity of a given reference signal type during the downlink data transmissions.

24. A non-transitory computer-readable medium storing code for wireless communication at a user equipment (UE), the code comprising instructions executable by a processor to:
receive a configuration message indicating a set of transmission configuration indicator (TCI) states for downlink data transmissions to the UE;
identify one or more reference signals to monitor for beam failure detection based at least in part on the indicated set of TCI states;
determine a reference signal type associated with each TCI state in the set of TCI states;
select, from the set of TCI states, a subset of TCI states for beam failure detection based at least in part on the reference signal type associated with each TCI state in the set of TCI states;
identify one or more beam failure detection beams based at least in part on the subset of TCI states and the identified one or more reference signals;
monitor the identified one or more reference signals using the identified one or more beam failure detection beams; and
selectively trigger a beam failure reporting procedure based at least in part on the monitoring.

25. The non-transitory computer-readable medium of claim 24, wherein the code comprising instructions executable by the processor to determine the reference signal type associated with each TCI state in the set of TCI states further comprises instructions executable by the processor to:
determine that a TCI state in the set of TCI states is associated with multiple reference signal types; and
select, based at least in part on an entry associated with the TCI state, one of the reference signal types associated with the TCI state for use in selecting the subset of TCI states.

26. The non-transitory computer-readable medium of claim 25, wherein the entry associated with the TCI state is a Type D entry of the TCI state.

27. The non-transitory computer-readable medium of claim 24, wherein the code comprising instructions executable by the processor to select the subset of TCI states for beam failure detection comprises instructions executable by the processor to:
determine an ascending or descending order of TCI states in the set of TCI states; and
identify a fixed quantity of TCI states for the subset of TCI states based on the ascending or descending order.

28. The non-transitory computer-readable medium of claim 24, wherein the code comprising instructions executable by the processor to selectively trigger the beam failure reporting procedure further comprises instructions executable by the processor to:
trigger the beam failure reporting procedure when all beams of the beam failure detection set have a block error rate (BLER) greater than an out-of-sync (OOS) BLER.

29. The non-transitory computer-readable medium of claim 24, wherein the code comprising instructions executable by the processor to identify the one or more reference signals is further based at least in part on a periodicity of a given reference signal type during the downlink data transmissions.

30. The non-transitory computer-readable medium of claim 24, wherein the code comprising instructions executable by the processor to identify the one or more reference signals is further based at least in part on a receive power associated with a given reference signal type.

* * * * *